(12) United States Patent
Chanda et al.

(10) Patent No.: US 11,502,898 B2
(45) Date of Patent: *Nov. 15, 2022

(54) LOGICAL L3 PROCESSING FOR L2 HARDWARE SWITCHES

(71) Applicant: Nicira, Inc., Palo Alto, CA (US)

(72) Inventors: Anupam Chanda, San Jose, CA (US); Pankaj Thakkar, Cupertino, CA (US)

(73) Assignee: NICIRA, INC., Palo Alto, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/987,548

(22) Filed: Aug. 7, 2020

(65) Prior Publication Data

US 2020/0366553 A1    Nov. 19, 2020

Related U.S. Application Data

(60) Division of application No. 15/959,283, filed on Apr. 23, 2018, now Pat. No. 10,805,152, which is a (Continued)

(51) Int. Cl.
*H04L 41/0803* (2022.01)
*H04L 41/12* (2022.01)
*H04L 45/00* (2022.01)

(52) U.S. Cl.
CPC .......... *H04L 41/0803* (2013.01); *H04L 41/12* (2013.01); *H04L 45/72* (2013.01)

(58) Field of Classification Search
CPC ..... H04L 41/0803; H04L 41/12; H04L 45/72; H04L 41/0876; H04L 45/306
See application file for complete search history.

(56) References Cited

U.S. PATENT DOCUMENTS 5,526,484 A    6/1996 Casper et al.
5,751,967 A    5/1998 Raab et al.
(Continued)

FOREIGN PATENT DOCUMENTS

EP    1154601 A1    11/2001
EP    1653688 A1    5/2006
(Continued)

OTHER PUBLICATIONS

Non-Published Commonly Owned U.S. Appl. No. 17/176,159, filed Feb. 15, 2021, 80 pages, Nicira, Inc.
(Continued)

*Primary Examiner* — Thai Nguyen
(74) *Attorney, Agent, or Firm* — Adeli LLP

(57) ABSTRACT

A method for configuring a managed forwarding element (MFE) to perform logical routing operations in a logical network on behalf of a hardware switch is described. The method of some embodiments receives data that defines a logical router that logically connects several different end machines operating on several different host machines to different physical machines that are connected to the hardware switch. The method, based on the received data, defines a number of routing components for the logical router. In some embodiments, the method then configures the MFE to implement the routing components in order to enable the MFE to perform logical routing operations on behalf of the hardware switch.

16 Claims, 11 Drawing Sheets

Related U.S. Application Data continuation of application No. 14/945,325, filed on Nov. 18, 2015, now Pat. No. 9,998,324.

(60) Provisional application No. 62/235,533, filed on Sep. 30, 2015.

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 10,313,186 B2 | 6/2019 | Wang et al. |
| 10,411,912 B2 | 9/2019 | Chanda et al. |
| 10,447,618 B2 | 10/2019 | Chanda |
| 10,554,484 B2 | 2/2020 | Chanda et al. |
| 10,659,431 B2 | 5/2020 | Basler |
| 10,764,111 B2 | 9/2020 | Chanda et al. |
| 10,805,152 B2 | 10/2020 | Chanda et al. |
| 10,924,386 B2 | 2/2021 | Davie et al. |
| 11,005,683 B2 | 5/2021 | Chanda et al. |
| 11,032,234 B2 | 6/2021 | Chanda et al. |
| 11,095,513 B2 | 8/2021 | Wang et al. |
| 11,196,682 B2 | 12/2021 | Chanda |
| 11,245,621 B2 | 2/2022 | Chanda et al. |
| 2002/0001310 A1 | 1/2002 | Mai et al. |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0037279 A1 | 2/2004 | Zelig et al. |
| 2004/0052216 A1 | 3/2004 | Roh |
| 2004/0267866 A1 | 12/2004 | Carollo et al. |
| 2005/0163115 A1 | 7/2005 | Dontu et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2007/0115961 A1 | 5/2007 | Dorenbosch et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0135823 A1 | 5/2009 | Liu et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0158086 A1 | 6/2011 | Sakauchi et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0084406 A1 | 4/2012 | Kumbalimutt |
| 2012/0147898 A1 | 6/2012 | Koponen et al. |
| 2012/0215876 A1 | 8/2012 | Ohtake |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1* | 2/2013 | Koponen ............ H04L 61/2592 370/254 |
| 2013/0044641 A1 | 2/2013 | Koponen et al. |
| 2013/0051399 A1 | 2/2013 | Zhang et al. |
| 2013/0054773 A1 | 2/2013 | Onoue |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 | 4/2013 | Koponen et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1* | 1/2014 | Nguyen ................. H04L 43/12 370/252 |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0247753 A1 | 9/2014 | Koponen et al. |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2014/0348161 A1 | 11/2014 | Koponen et al. |
| 2014/0362775 A1 | 12/2014 | Steiner et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0103838 A1 | 4/2015 | Zhang et al. |
| 2015/0124586 A1 | 5/2015 | Pani |
| 2015/0124809 A1 | 5/2015 | Edsall et al. |
| 2015/0124821 A1 | 5/2015 | Chu et al. |
| 2015/0195178 A1 | 7/2015 | Bhattacharya et al. |
| 2015/0215189 A1 | 7/2015 | Lim |
| 2015/0281075 A1 | 10/2015 | Park et al. |

(56) References Cited

U.S. PATENT DOCUMENTS

| | | |
|---|---|---|
| 2015/0326425 A1 | 11/2015 | Natarajan et al. |
| 2015/0326524 A1 | 11/2015 | Tankala et al. |
| 2015/0334696 A1 | 11/2015 | Gu et al. |
| 2015/0372906 A1 | 12/2015 | Tirat |
| 2015/0379150 A1 | 12/2015 | Duda |
| 2015/0381428 A1* | 12/2015 | Ong .................. H04L 45/42 709/223 |
| 2016/0014039 A1 | 1/2016 | Reddy et al. |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352613 A1 | 12/2016 | Narayanan et al. |
| 2016/0352633 A1 | 12/2016 | Kapadia et al. |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093617 A1 | 3/2017 | Chanda et al. |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 | 3/2017 | Uttaro et al. |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0272316 A1 | 9/2017 | Johnson et al. |
| 2017/0317928 A1 | 11/2017 | Gude et al. |
| 2017/0339054 A1 | 11/2017 | Yadav et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |
| 2018/0183730 A1 | 6/2018 | Chanda |
| 2018/0219699 A1 | 8/2018 | Chanda et al. |
| 2018/0241622 A1 | 8/2018 | Chanda et al. |
| 2018/0241672 A1 | 8/2018 | Chanda et al. |
| 2018/0248796 A1 | 8/2018 | Chanda et al. |
| 2019/0089622 A1 | 3/2019 | Davie et al. |
| 2019/0141011 A1 | 5/2019 | Basler |
| 2019/0207904 A1 | 7/2019 | Chanda et al. |
| 2019/0238393 A1 | 8/2019 | Chanda et al. |
| 2019/0260637 A1 | 8/2019 | Wang et al. |
| 2019/0356512 A1 | 11/2019 | Chanda et al. |
| 2020/0021541 A1 | 1/2020 | Chanda |
| 2020/0396206 A1 | 12/2020 | Basler |
| 2021/0243112 A1 | 8/2021 | Davie et al. |
| 2022/0078111 A1 | 3/2022 | Chanda et al. |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Al-Fares, Mohammad, et al., "A Scalable, Commodity Data Center Network Architecture," SIGCOMM '08, Aug. 17-22, 2008, 12 pages, Seattle, Washington, USA.

Graubner, Pablo, et al., "Cloud Computing: Energy-Efficient Virtual Machine Consolidation," IT Professional, Mar. 2013, 7 pages, vol. 15, Issue 2, IEEE.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

* cited by examiner

LOGICAL L3 PROCESSING FOR L2 HARDWARE SWITCHES

CLAIM OF BENEFIT TO PRIOR APPLICATIONS

This application is a divisional application of U.S. patent application Ser. No. 15/959,283, filed Apr. 23, 2018, now published as U.S. Patent Publication 2018/0241622. U.S. patent application Ser. No. 15/959,283 is a continuation application of U.S. patent application Ser. No. 14/945,325, filed Nov. 18, 2015, now issued as U.S. Pat. No. 9,998,324. U.S. patent application Ser. No. 14/945,325 claims the benefit of U.S. Provisional Patent Application 62/235,533, filed Sep. 30, 2015. U.S. patent application Ser. No. 15/959,283, now published as U.S. Patent Publication 2018/0241622, and U.S. patent application Ser. No. 14/945,325, now issued as U.S. Pat. No. 9,998,324, are incorporated herein by reference.

BACKGROUND

There is a growing movement, driven by both industry and academia, towards a new network control paradigm called Software-Defined Networking (SDN). In Software-Defined Networking (SDN), a control plane implements and maintains the control logic that governs the forwarding behavior of shared network switching elements on a per user basis. A virtual network that is implemented for a tenant of a hosting system is a good example of an SDN. The virtual (logical) network of a tenant of the hosting system connects a set of data compute nodes (e.g., virtual machines) that are assigned to the tenant, to each other and to other virtual and/or physical networks through a set of logical switches and logical routers.

One of the challenges in today's hosting system networks is extending the virtual networks (e.g., of one or more tenants) to other physical networks through hardware switches (e.g., third-party hardware switches) by enabling the hardware switches to implement logical L2 and L3 forwarding elements.

BRIEF SUMMARY

Some embodiments provide a novel method for performing logical routing functionalities for a layer 2 (L2) managed hardware forwarding element (MHFE) in order to integrate the physical workload attached to the L2 MHFE (e.g., an L2 hardware switch) with one or more logical networks. In some embodiments, the method is performed by a control plane that configures and manages one or more logical networks for one or more tenants of a hosting system (e.g., a datacenter). Some embodiments configure one or more logical routers of a logical network that should be implemented by the L2 MHFE, on one or more designated transport nodes. A designated transport node, in some embodiments, includes a particular endpoint (e.g., a Virtual Extensible LAN (VXLAN) Tunnel Endpoint or VTEP), among other endpoints of a logical network, that performs distributed routing processing on behalf of the L2 hardware switch.

In some embodiments, the designated transport node is the same transport node that performs message replication for hardware switches that are incapable of replicating messages. That is, the same transport node that handles the replication and forwarding of broadcast, unknown unicast, multicast (BUM) traffic, performs the distributed L3 processing for the L2 hardware switch in the logical network. The same control plane that configures and manages one or more logical networks for one or more tenants of a hosting system (e.g., a datacenter), configures and manages the designated transport nodes in some embodiments. A logical network of the hosting system, in some embodiments, includes a set of logical forwarding elements (e.g., logical switches and routers) that logically connects different end machines (e.g., virtual machines, containers, etc.) that run on the same or different host machines.

In some embodiments, different subsets of end machines reside on different host machines that execute managed forwarding elements (MFEs). Each MFE operating on a host machine implements the logical forwarding elements (LFEs) of the logical network to which the local end machines of the host machine are logically connected. The MFE of some embodiments is a software instance that is implemented in the virtualization software (e.g., a hypervisor) of the host machine. The LFEs are also implemented by one or more MHFEs (e.g., top of rack or TOR switches) in order to connect the physical machines that are connected to the MHFEs to the other end machines of the logical network. Some embodiments designate one or more managed software forwarding elements (MSFEs) that implement the LFEs, as physical-network tunneling end points (PTEPs) for handling distributed L3 functionalities (and/or BUM traffic if required) on behalf of different MHFEs that are incapable of performing such operations. In some other embodiments, a PTEP is a dedicated machine that is assigned to handle routing functionalities and/or BUM traffic for hardware forwarding elements that are not capable of doing so.

In some embodiments, a central control plane (CCP) cluster (e.g., a particular controller of the CCP cluster) selects one or more PTEPs for handling the logical routing for L2 hardware switches and programs the tunneling IP (VTEP-IP) addresses of these chosen PTEPs onto these hardware switches. These PTEPs serve as candidate intermediate destination tunneling endpoints for distributed routing. For an L2 hardware switch to send network traffic that needs to be routed (i.e., L3 packets) onto a particular logical router, the hardware switch tunnels the L3 packet to one of the designated PTEPs. The PTEP then routes the packet towards its final destination (e.g., to an external next physical hop, to an end machine associated with a logical port of an L2 logical switch, to a logical port of a different logical router as the next hop in the logical network, etc.).

In some embodiments, a PTEP is an MSFE that is selected and configured to implement one or more logical routers for one or more L2 hardware switches in one or more overlay logical networks. In some embodiments, each overlay logical network has its corresponding set of PTEPs, and different logical networks can have different sets of PTEPs. In some embodiments, the network controller selects the MSFEs to serve as PTEPs in a manner that balances traffic load or computation load across different host machines. In some such embodiments, one of the PTEPs is selected to receive the L3 packet from the L2 MHFE and perform its routing operation. Such a selection can be based on load balancing algorithms (e.g., based on a hash value from the packet header) in some embodiments.

The control plane of some embodiments receives a definition of a logical router (e.g., through an application programming interface or API) and defines several routing components for the logical router. Each of these routing components is separately assigned a set of routes and a set of logical interfaces (ports). Each logical interface of each routing component is also assigned a network layer (e.g., Internet Protocol or IP) address and a data link layer (e.g., media access control or MAC) address. In some embodiments, the several routing components defined for a logical router include a single distributed router (also referred to as distributed routing component) and several different service routers (also referred to as service routing components). In addition, the control plane of some embodiments defines a transit logical switch (TLS) for handling communications between the components internal to the logical router (i.e., between the distributed router and the service routers).

Some embodiments implement the distributed routing component of the logical router in a distributed manner across the different MSFEs, including the designated PTEPs, as well as other L3 MHFEs that are capable of performing routing operations. Some embodiments implement each of the service routing components of the logical network on an edge node (e.g., a gateway), which is a machine at the edge of the network (e.g., the datacenter network), in order to communicate with one or more external networks. Each of the service components has an uplink interface for communicating with an external network as well as a TLS interface for connecting to the transit logical switch and communicating the network data with the distributed routing component of the logical router that is also connected to the TLS.

In order to configure an L2 hardware switch to offload L3 packets destined for a logical port of a logical router, some embodiments configure a set of database tables (e.g., forwarding tables associated with the forwarding elements) on the L2 MHFE using an open source protocol (e.g., an open vSwitch database management (OVSDB) protocol), which is recognizable by the MHFE. Such an open source protocol requires minimal software to execute on the MHFE (e.g., TOR switch) and to enable the MHFE to implement the logical network forwarding elements (e.g., logical L2 switches) in order to communicate with the other machines connected to the logical network as well as other external networks.

Some embodiments use a database schema (e.g., OVSDB schema, hardware VTEP database schema) to propagate a particular set of tables of a database stored on an L2 MHFE. Such embodiments propagate the tables with configuration data to configure the L2 MHFE to forward the L3 packets they receive to a set of PTEPs. One such table includes the physical locator data of the PTEPs that implement the different routing components (i.e., distributed and service routers) of the logical router. The physical locator data, in some embodiments, specify the tunnel (e.g., Virtual Extensible LAN or VXLAN tunnel) endpoint addresses (i.e., IP addresses) of the PTEPs. By locating the endpoints of the PTEPs, the L2 MHFE is able to establish tunnels between themselves and the PTEPs, and exchange L3 packets through the established tunnels (i.e., the MHFE would be able to use a tunnel protocol such as VXLAN protocol to exchange L3 packets with the PTEPs).

As described above, some embodiments implement the distributed routing component of a logical router on every MSFE (including the PTEPs) and L3 MHFE that participates in the logical network (i.e., implements the LFEs of the logical network). Each logical port of the logical router has a virtual MAC (VMAC) address that is associated with a logical port of a logical switch. When a PTEP performs the L3 functionalities on an L3 packet on behalf of an L2 MHFE, the PTEP needs to know the next destination's (e.g., next hop, final destination virtual or physical machine, etc.) of the L3 packet to route the packet towards its next and/or final destination.

When the PTEP does not have the destination MAC address of the L3 packet (e.g., the address was not previously cached), the PTEP generates an address resolution protocol (ARP) query in order to learn the destination MAC address. That is, the PTEP sends an ARP request packet to all network elements that are in the subnet associated with the destination network address (IP address) of the L3 packet. The source MAC address of the ARP packet should be the VMAC address of the logical port of the distributed router from which the ARP packet is sent. Since this VMAC address is common between all of the MSFEs and L3 MHFEs that implement the distributed router, using the VMAC address does not guaranty that the ARP reply packet returns to the originator of the ARP request packet.

In order to guaranty that the ARP reply packet returns to the originator of the ARP request packet, some embodiments use a physical MAC (PMAC) address that is unique for each MSFE and L3 MHFE of the logical network (including the PTEPs). In some embodiments, the PTEP (or any other forwarding element that generates an ARP request to learn the destination MAC address) uses this unique PMAC address as the source address of the ARP request packet when the PTEP sends the packet to other MSFEs and L3 MHFEs. The PTEP of some embodiments, however, uses the VMAC address of the logical port of the distributed router (instead of the PMAC address of the MSFE) when the PTEP sends the ARP request packet to an L2 MHFE. This is because the PMAC value in the source MAC address of the ARP request packet would confuse the L2 MHFE (e.g., L2 hardware VTEP) as it does not match the VMAC of the logical router port. How the PMAC address being the source MAC address of the ARP packet confuses the L2 hardware VTEP is described further below.

When a hardware VTEP receives an L3 packet from the physical workload attached to the hardware VTEP (e.g., a physical machine connected to the hardware VTEP) that has a destination MAC address of a logical router port, the destination address is treated as an unknown address. This is because the hardware VTEP does not have the necessary information to implement the logical router, which causes the hardware VTEP to subsequently forward the packet to a PTEP that implements the logical router. Even though the hardware VTEP does not know the destination MAC address of the packet, the hardware VTEP stores the MAC address (i.e., the logical router port's address) in a local cache as it does for any other outgoing packet.

Therefore, when the hardware VTEP receives the PMAC address as the destination MAC address that the ARP response packet should be sent to, the hardware VTEP would not be able to match the address against the previously cached addresses, which results in the confusion of the hardware VTEP. This problem does not exist for the MSFEs and L3 hardware VTEPs (MHFEs) though, since these managed forwarding elements (MFEs) implement a mechanism to switch the PMAC addresses to their corresponding VMAC addresses before the ARP request packets are sent to the destination end machines connected to the MFEs. The MSFEs and L3 MHFEs also switch back the VMAC addresses to their original PMAC address after the ARP reply packets are received from the destination end machines. As such, the MSFEs and L3 MHFEs can match the VMAC address against their local cache tables and do not get confused.

Using the VMAC address, however, could cause the L2 hardware VTEP to forward the ARP reply packet to a different PTEP (other than the originator of the ARP request packet). This is because the L2 hardware VTEP sends the packets with unknown destination MAC addresses to a designated set of PTEPs that is supposed to handle the routing function. One of the PTEPs, based on a particular algorithm (e.g., the has of the packet header), will be selected to process the L3 packet sent by the L2 hardware VTEP. The selected PTEP, however, might be a different PTEP from the PTEP that originated the ARP query. To address this issue, in some embodiments, the originator PTEP of the ARP request forwards a copy of the ARP request packet to all other designated PTEPs (i.e., PTEPs that might receive the ARP reply packet from the hardware VTEP), in addition to forwarding the ARP request packet to the L2 hardware VTEP. Forwarding the copies of the ARP request packet enables all other designated PTEPs to identify the original requester of a given ARP query. Therefore, when the ARP reply packet from an L2 hardware VTEP arrives at a different PTEP, that PTEP forwards the reply packet to the PTEP that originated the ARP request.

Similar to PTEPs, any other managed forwarding element (e.g., a MSFE or an L3 MHFE) also uses a unique PMAC address when generating ARP requests to learn the next destination MAC address (e.g., when an MSFE sends an ARP query from a logical router port that the MSFE implements to other MFEs). Before forwarding the ARP request to an L2 hardware VTEP though, the managed forwarding element replaces the PMAC address with the VMAC address of the logical router port in the same manner that was described above for the PTEPs. Additionally, the managed forwarding element sends a copy of the ARP request to all of the L3 offload engines (i.e., designated PTEPs) to enable the offload engines to identify the original ARP requester. The ARP reply from the hardware VTEP may arrive at any L3 offload engine, which can then be forwarded to the originator of the ARP request.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
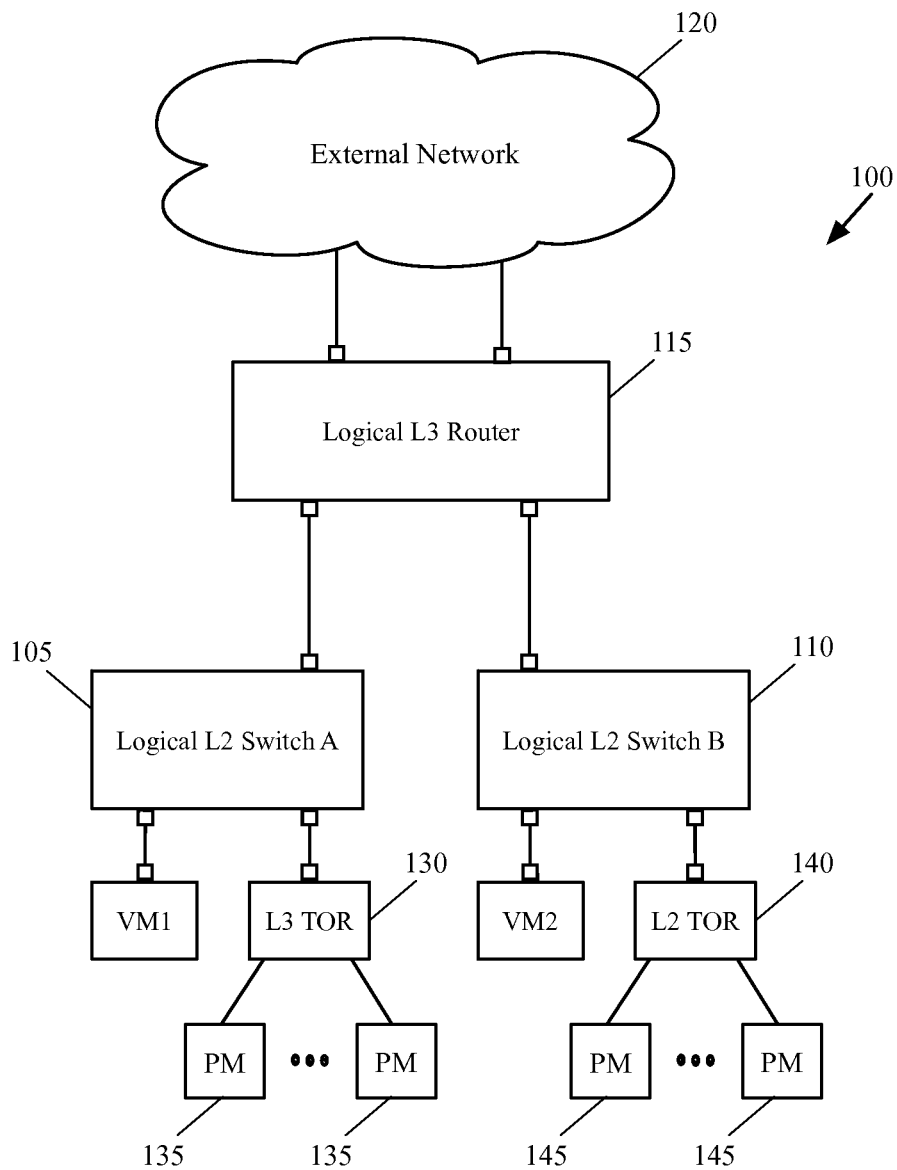
FIG. 1 illustrates the configuration view of a distributed logical router in a logical network that is integrated with different types of hardware switches (e.g., L2 and L3 hardware switches).

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for performing logical routing functionalities for a layer 2 (L2) managed hardware forwarding element (MHFE) in order to integrate the physical workload attached to the L2 MHFE (e.g., an L2 third-party hardware switch such as an L2 top-of-rack (TOR) switch) with one or more logical networks. In some embodiments, the method is performed by a control plane that configures and manages one or more logical networks for one or more tenants of a hosting system (e.g., a datacenter). Some embodiments configure one or more logical routers of a logical network on one or more designated transport nodes. A designated transport node, in some embodiments, includes a particular endpoint (e.g., a Virtual Extensible LAN (VXLAN) Tunnel Endpoint or VTEP), among other endpoints of a logical network, that performs distributed routing processing on behalf of the L2 hardware switch.

In some embodiments, the designated transport node is the same transport node that performs message replication for hardware switches that are incapable of replicating messages. That is, the same transport node that handles the replication and forwarding of broadcast, unknown unicast, multicast (BUM) traffic, performs the distributed L3 processing for the L2 hardware switch in the logical network. The same control plane that configures and manages one or more logical networks for one or more tenants of a hosting system (e.g., a datacenter), configures and manages the designated transport nodes. In some embodiments, a logical network of the hosting system includes a set of logical forwarding elements (e.g., logical switches and routers) that logically connects different end machines (e.g., virtual machines, containers, etc.) that run on different host machines.

In some embodiments, different subsets of end machines reside on different host machines that execute managed forwarding elements (MFEs). Each MFE operating on a host machine implements the logical forwarding elements (LFEs) of the logical network to which the local end machines of the host machine are logically connected. The MFE of some embodiments is a software instance that is implemented in the virtualization software (e.g., a hypervisor) of the host machine. The LFEs are also implemented by one or more MHFEs in order to connect the physical machines that are connected to the MHFEs to the other end machines of the logical network. Some embodiments designate one or more MFEs that implement the LFEs, as physical-network tunneling end points (PTEPs) for handling distributed L3 functionalities (and BUM traffic if required) on behalf of different TORs that are incapable of performing such operations.

The control plane of some embodiments receives a definition of a logical router (e.g., through an application programming interface or API) and defines several routing components for the logical router. Each of these routing components is separately assigned a set of routes and a set of logical interfaces (ports). Each logical interface of each routing component is also assigned a network layer (e.g., Internet Protocol or IP) address and a data link layer (e.g., media access control or MAC) address. In some embodiments, the several routing components defined for a logical router include a single distributed router (also referred to as distributed routing component) and several different service routers (also referred to as service routing components). In addition, the control plane of some embodiments defines a transit logical switch (TLS) for handling communications between the components internal to the logical router (i.e., between the distributed router and the service routers).

Some embodiments implement the distributed routing component of the logical router in a distributed manner across the different MFEs, including the designated PTEPs, as well as other L3 MHFEs that are capable of performing routing operations. Some embodiments implement each of the service routing components of the logical network on an edge node (e.g., a gateway), which is a machine at the edge of the network (e.g., the datacenter network) in some embodiments, in order to communicate with one or more external networks. Each of the service components has an uplink interface for communicating with an external network as well as a TLS interface for connecting to the transit logical switch and communicating the network data with the distributed routing component of the logical router that is also connected to the TLS.

The service components of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In some embodiments, the logical router is part of a two-tier logical network structure. The two-tier structure of some embodiments includes (1) a single logical router (referred to as a provider logical router (PLR) and administrated by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the control plane defines a transit logical switch between the distributed component of the PLR and the service components of the TLR.

For a PLR logical router, some embodiments use active-active mode whenever possible, and only use active-standby mode when stateful services (e.g., NAT, firewall, load balancer, etc.) are configured for the PLR. In active-standby mode, only one of the service routing components is active, i.e., fully operational at a time, and only this active routing component sends out messages to attract traffic. All other service routing components are in standby mode. In some embodiments, the active service component and a standby service component use the same IP address, but different MAC addresses, for communicating with the distributed component. However, only the active component replies to address resolution protocol (ARP) requests from this distributed component. Furthermore, only the active service component advertises routes to the external network to attract traffic.

For a TLR logical router, some embodiments either use no service components or two service components in active-standby mode when stateful services are configured for the TLR. The TLR operates internally in the same manner as a PLR in active-standby mode, i.e., having an active component and a standby component sharing the same network layer address, but only the active component responding to ARP requests. To connect to the PLR, some embodiments assign each of the two service components of the TLR a same network layer address (though different from the IP address used to connect to its own distributed component).

The logical router described above is a distributed logical router implemented by a single distributed routing component and a set of service routing components. Some embodiments provide other types of logical router implementations in a physical network (e.g., a datacenter network) such as a centralized logical router. In a centralized logical router, L3 logical routing functionalities are performed in only gateway machines, and the control plane of some embodiments does not define any distributed routing component and instead only defines multiple service routing components, each of which is implemented in a separate gateway machine.

Different types of logical routers (e.g., distributed logical router, multi-layer logical routers, etc.) with multiple routing components and implementation of the different types of logical routers on edge nodes and managed forwarding elements operating on host machines of a datacenter are described in greater detail in the U.S. patent application Ser. No. 14/814,473, filed Jul. 30, 2015, now issued as U.S. Pat. No. 9,787,605, which is incorporated herein by reference.

The above introduced the general concepts of a logical router configuration as well as certain aspects of the logical router configuration of some embodiments. In the following, Section I describes how a particular set of managed forwarding elements (e.g., a set of PTEPs) is configured to process L3 packets for the L2 hardware switches. Next, Section II compares the ARP queries generated for L2 hardware switches with ARP queries generated for other MFEs (e.g., MSFEs, L3 MHFEs, etc.). Section III then describes the electronic system with which some embodiments of the invention are implemented.

I. Configuring PTEPs to Perform L3 Functionalities for L2 MHFEs

Some embodiments provide a distributed logical router implementation that enables first-hop routing in a distributed fashion (rather than concentrating all of the routing functionality at the gateways). In the physical realization, the logical router of some embodiments includes a single distributed routing component (also referred to as a distributed router or a DR) and one or more service routing components (also referred to as service routers or SRs). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more MHFEs (e.g., third-party TOR switches) that are capable of performing routing operations. The DR of some embodiments is responsible for first-hop distributed routing between logical switches and/or other logical routers that are logically connected to the logical router.

In some embodiments, not all of the hardware switches that participate in one or more logical networks are capable of performing distributed routing operations. That is, in some embodiments, some of the MHFEs (e.g., third-party hardware switches) are only capable of implementing logical L2 switches for the logical networks. Such MHFEs are referred to as L2 MHFEs in some embodiments. An MHFE is an L2 MHFE, when the MHFE does not have one or more database tables that are required for implementing logical routers. More specifically, in some embodiments, the control plane computes and distributes the logical configuration and forwarding data to each MHFE using an open source protocol that is recognizable and used by the MHFE (e.g., an open vSwitch database management (OVSDB) protocol). The control plane communicates with the MHFEs through the OVSDB protocol by populating different forwarding tables instantiated on the MHFEs using a database schema (e.g., hardware VTEP database schema, OVSDB schema).

In some embodiments, an MHFE is incapable of handling distributed logical routing operations when one or more forwarding tables that are required for implementing distributed logical routers (e.g., a Logical Router table in the VTEP database schema that identifies the binding between the different logical router ports and different logical switches and other static routes) are not defined among the forwarding tables of the database that is instantiated on the MHFE. Hence, such an MHFE is referred to as an L2 MHFE in these embodiments. An L2 MHFE, however, is fully capable of implementing the logical L2 switches for different logical networks. In some embodiments, an LR that encompasses a distributed logical router does not span the L2 hardware switches that participate in logical networks. In order to enable the L2 hardware switches to participate in L3 logical networks, some embodiments assign one or more managed forwarding elements (e.g., PTEPs) to perform L3 processing for the L3 packets that arrive at the L2 hardware switches (e.g., the L3 packets that are originated from the physical machines that are connected to the hardware switch).

Aside from the distributed component of the logical router that span all of the forwarding elements in some embodiments, the service routers (SRs) span only the edge nodes of the logical networks and are responsible for delivering services that are not implemented in a distributed fashion (e.g., some stateful services). The service components of a logical router are also responsible for connecting the logical network in which the logical router operates to external network(s). A distributed logical router will have SRs if either (i) the logical router is a provider logical router (PLR), and therefore connects to external physical networks or (ii) the logical router has services configured that do not have a distributed implementation (e.g., NAT, load balancing, DHCP in some embodiments). Even if there are no stateful services configured on a PLR, some embodiments use SRs for failure handling and for ECMP.

Logical routers, in some embodiments, can be viewed from three different perspectives. The first of these views is the API view, or configuration view, which is how the user (e.g., a datacenter provider or tenant) views and defines the logical router. The second view is the control plane or management plane view, which is how the CCP cluster (e.g., one or more controller computers in the CCP cluster) internally defines the logical router. Finally, the third view is the physical realization, or implementation of the logical router, which is how the logical router is actually implemented in the physical network.

FIG. 1 illustrates the configuration view of a distributed logical router in a logical network that is integrated with different types of hardware switches (e.g., L2 and L3 hardware switches). The logical network and its different logical elements, including the logical router, might have been designed by a user (e.g., a network administrator, a tenant of a datacenter, etc.). As shown, the logical router 115 is part of the logical network 100, which also includes two other logical switches 105 and 110. The logical router 115 has two logical ports that are connected to the logical switches 105 and 110.

Logical switch 105 has logical ports that are connected to a virtual machine VM1 and an L3 TOR switch 130 while the logical switch 110 has logical ports connected to another virtual machine VM2 and L2 TOR switch 140. The logical router 115 also includes two logical ports that connect to the external physical network 120. The TOR switch 130 connects a set of physical machines 135 (e.g., physical servers, physical computers, printers, etc.) to the VMs and another set of physical machines 145 in the logical network 100 through the logical switches 105 and 110, and the logical router 115. Similarly, the TOR switch 140 connects the set of physical machines 145 to the VMs and other physical machines 135 in the logical network 100 through the logical switches 105 and 110, and the logical router 115. In some embodiments, the TOR switches 130 and 140 are third-party top of rack switches while the physical machines 135 and 140 are the host machines of the same or different hosting systems.

The logical forwarding elements (i.e., logical switches and routers) that are shown in this example are implemented by a set of physical managed forwarding elements (hardware and software) in order to logically connect the different end machines (virtual and physical) to each other in the logical network. Each logical switch is implemented by the managed forwarding element that connects to one or more of the end machines. Additionally, the distributed routing component of the logical router 115, as described in more detail below, is also implemented by the managed forwarding elements through which the VM machines are connected to the logical network. The distributed routing component is further implemented by the L3 TOR switch 130 through which the physical machines 135 are connected to the logical network.

However, the L2 TOR switch 140 is not capable of performing logical distributed routing functionalities since this TOR switch cannot implement the distributed routing component of the logical router. As described above and further below, one or more designated PTEPs implement the distributed routing component of the logical router (as well as other necessary routing components) for the L2 TOR switch 140 in order for the PTEPs to perform routing operations for the L3 packets arrived at this TOR switch (L3 packets received from any of the physical machines 145 destined for the virtual machine VM1 or any of the physical machines 135, or L3 packets from the virtual machine VM1 or any of the physical machines 135 destined for any of the physical machines 145).

While shown as VMs in this figure and other figures below, it should be understood that other types of data compute nodes (e.g., namespaces, containers, etc.) may connect to logical forwarding elements (e.g., logical switches 105 and 110, or logical router 115) in some embodiments. It should also be understood that although in the example figures a managed hardware forwarding element (MHFE) is shown as a TOR switch, the MHFE can be any other third-party hardware forwarding element (e.g., other physical switches and routers, appliances such as firewalls, load balancers, etc.). Additionally, although in the illustrated example, as well as other examples below, only one L2 TOR switch and/or one L3 TOR switch is shown to connect a physical workload to the logical network(s), one of ordinary skill in the art would realize that many more TOR switches (of any type) or other third-party hardware switches can connect to the logical network(s) in the same manner. The illustrated examples include only one TOR switch of each type in order to simplify the figures and the descriptions.

Figure 2:
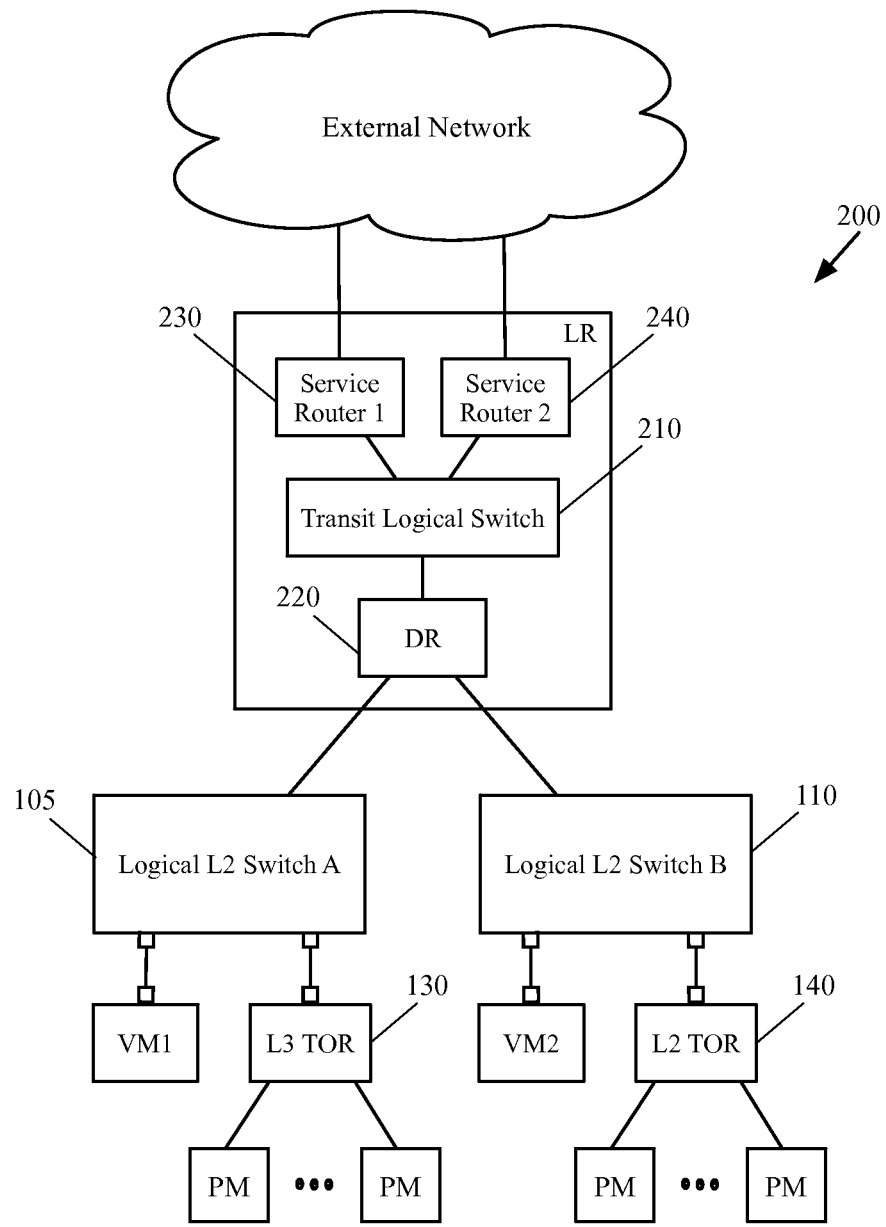
FIG. 2 illustrates the management (control) plane view of the logical network shown in FIG. 1.

FIG. 2 illustrates the management (control) plane view of the logical network 100 shown in FIG. 1. The control plane view 200 for the distributed implementation illustrates that the control plane, after receiving the configuration data of the distributed logical router, creates a distributed router 220, two service routers 230 and 240, and a transit logical switch 210 based on the received logical router data. In some embodiments, the control plane generates separate routing information bases (RIBs) and/or forwarding information bases (FIBs) for each of the routing components 220, 230, and 240. That is, in addition to having separate objects created in the management/control plane, each of the routing components is treated as a separate router with separate routing tables.

The transit logical switch 210 has different logical ports for each of the routing components 220-240 and each of these routing component has an interface to logically connect to the transit logical switch 210. The configuration of the northbound and southbound interfaces of the various routing components 220-240 and their connections with the transit logical switch 210 will be described in further detail below by reference to FIGS. 3 and 7.

Figure 3:
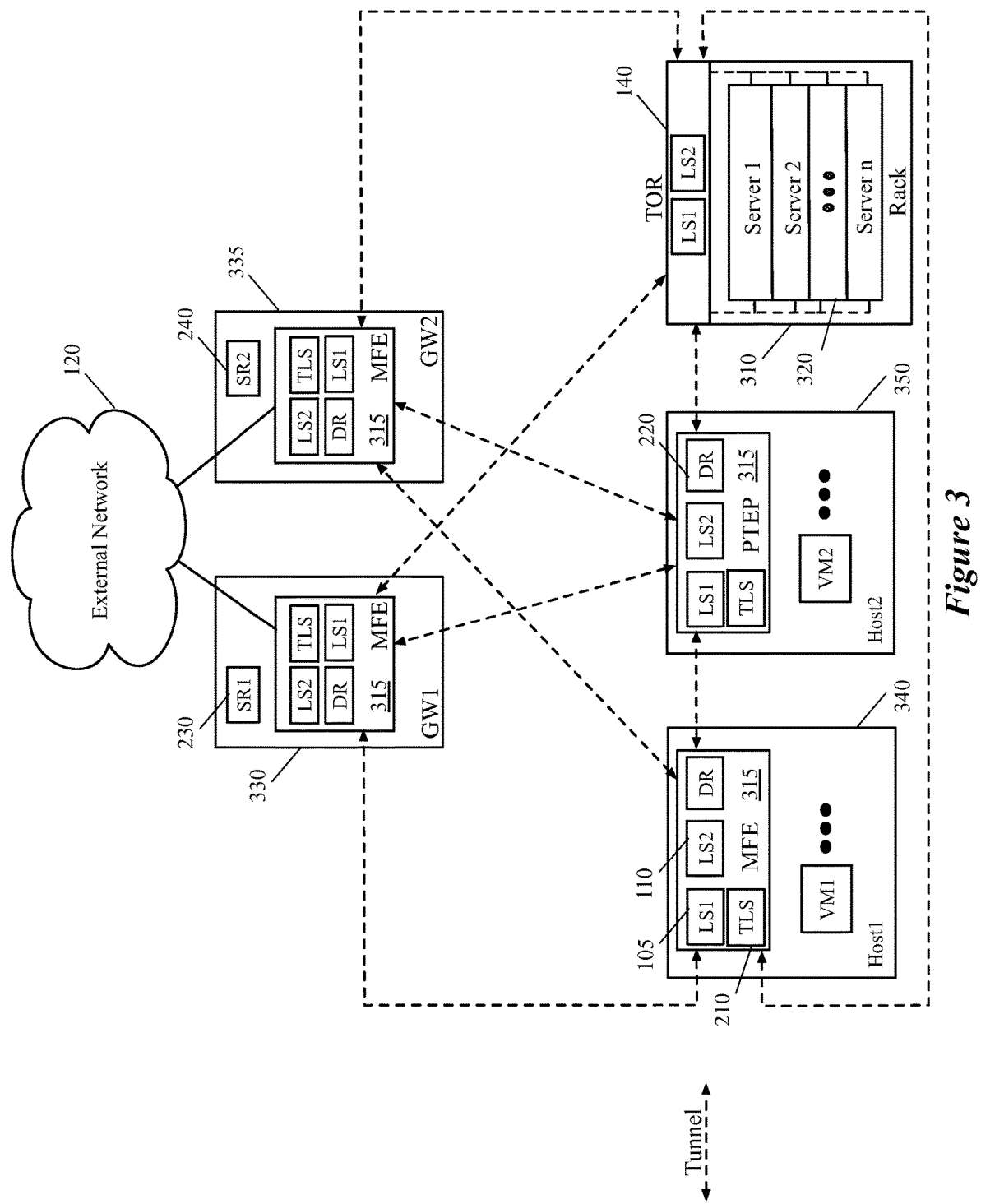
FIG. 3 illustrates the physical distributed implementation of the logical router of FIG. 1.

FIG. 3 illustrates the physical distributed implementation of the logical router 115 of FIG. 1 (with the exception that the L3 TOR machine 130 is not displayed in this figure in order to simplify the figure). This figure shows two gateway machines 330 and 335 that are connected to external network 120. The gateway machines are also connected to the host machines 340 and 350, as well as the rack 310. Each host machine hosts a set of end machines and executes an MFE 315. Each of the gateway machines also executes an MFE 315, as well as a service router instance (i.e., SRs 230 and 240). The rack 310 includes a set of servers 320 as well as the TOR switch 140.

As shown, the virtual machine VM1, which couples to the logical switch 105 (LS1) in the logical network 100, operates on the host machine 340, while the virtual machine VM2 that couples to the logical switch 110 (LS2) in the logical network 100, operates on the host machine 350. Although, different end machines are not necessarily required to be connected to different logical switches to operate on different host machines. For example, in some embodiments, several end machines that are connected to a single logical switch operate on several different host machines. Alternatively, or conjunctively, two end machines that are connected to a same logical switch might operate on the same host machine in some embodiments.

The L2 TOR switch 140 that couples to the logical switch 110 is part of the rack 310, which also includes a set of servers 320 that are connected to the TOR switch 140. In some embodiments, the rack 310 is a hosting system rack and the servers 320 are host machines of the hosting system. In some embodiments, the TOR switch 140 is a third-party top of rack switch. The virtual machines VM1 and VM2 and servers 320 communicate (e.g., exchange network data) with each other and other network elements via the logical network 100. As will be described in more detail below, the L3 TOR switch 130 that couples to the logical switch 105 (not shown) is similar to the L2 TOR switch 140, except that the L3 TOR switch 130 also implements the TLS 210 and the DR 220 hence this TOR switch is capable of performing logical L3 functionalities.

Each host machine executes a managed forwarding element (MFE) 315. In some embodiments, the MFEs 315 operating on the host machines are physical software switches provided by the hypervisors or other virtualization software on the host machines. As illustrated, the MFE 315 of the host machine 350 is a designated MFE that in some embodiments is also referred to as a PTEP. In other words, a PTEP can be any of the MFEs that are operating on the host machines, which has been assigned as the PTEP by the control plane of the network. More specifically, the control plane assigns a particular set of one or more MFEs (i.e., the PTEPs) as offloading engines on which some of the hardware switches that are incapable of routing offload L3 processing operations. In some embodiments, this particular set of MFEs is also assigned to handle BUM traffic management for hardware switches that are not capable of doing so.

As shown, the MFE 315 that executes on the host machine 350 has been designated as a PTEP to handle the L3 processing operations and/or BUM traffic for the L2 TOR switch 140, while the same MFE is connected to the virtual machine VM2 operating on the host machine 350 and implements the logical switch LS2 in order to logically connect VM2 to other network elements of the logical network. In some other embodiments, a PTEP operates on a dedicated machine that is designated for handling the L3 processing operations and/or BUM traffic for the hardware switches that are incapable of handling these types of operations.

The illustrated L2 TOR switch 140 operates as a managed hardware forwarding element (MHFE). In some embodiments, an MHFE is a third-party hardware switch that implements one or more logical networks (by implementing the LFEs of the logical networks) and logically connects the physical workload attached to it (e.g., physical servers 320 connected to different ports of the TOR switch 140) to the end machines and other network elements in the logical networks. As described above, an MHFE of some embodiments can be (i) an L3 MHFE which is capable of implementing both L2 logical switches and L3 distributed logical switches of a logical network, or (ii) an L2 MHFE which is only capable of implementing L2 logical switches of the logical network.

The MFEs operating on the host machines 340 and 350 perform first-hop switching for the logical switches 105 and 110 for packets sent by the virtual machines VM1 and VM2 of the logical network 100 (unless the pipeline of the transit logical switch 210 of the MFE specifies to send the packet to a SR). The MFEs residing on the host machines Host1 and Host2 may also implement logical switches (and distributed logical routers) for other logical networks if the other logical networks have VMs that reside on the host machines Host1 and Host2 as well. Similarly, the MHFE 130 (although not shown) also performs first-hop switching for the logical switches 105 and 110 for packets sent by the physical machines 320. However, the MHFE 140 does not perform any first-hop routing and instead delegates this operation to PTEP 315 running on the host machine 350. As shown in the figure, the TOR switch 140 only implements the logical switches LS1 and LS2 and does not implement any of the routing components of the logical router (i.e., the DR 220 or the TLS 210).

As described above, the control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) to a set of physical machines using a set of logical forwarding elements (e.g., logical L2 and L3 switches). In some embodiments, different subsets of end machines reside on different host machines that execute managed forwarding elements (MFEs). The MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

In some embodiments, the logical forwarding elements are implemented by one or more MHFEs (e.g., TOR switches) in order to connect the physical machines that are connected to the MHFEs to the other end machines of the logical network. In other words, each of the host machines executes an MFE that processes packets sent to and received from the end machines residing on the host machine, and exchanges these packets with other MFEs operating on other host machines as well as the MHFEs (e.g., through tunnels established by network overlay encapsulation).

In some embodiments, when the MFE receives a packet from a VM that is coupled to the MFE, it performs the processing for the logical switch to which that VM logically couples, as well as the processing for any additional logical forwarding elements (e.g., logical router processing if the packet is sent to an external network, logical router processing and processing for the other logical switch in the network if the packet is sent to an end machine coupled to the other logical switch, etc.).

In some embodiments, the MFEs implement the logical forwarding elements through a set of flow entries. These flow entries are generated by a local controller operating on each host machine (not shown). The local controller of each host machine generates the flow entries by receiving the logical forwarding data from the control plane and converting the logical forwarding data to the flow entries for routing the packets of the logical network in the host machine. That is, the local controller, operating on a host machine, converts the universal logical forwarding data that is computed and sent by the control plane to every local controller operating on different host machines, to a customized set of forwarding behaviors that is recognizable and used by the MFE that operates on the same host machine as the local controller.

The MFE then uses the customized set of forwarding data to forward the packets of the logical network between the end machines operating on the host machine. In other words, by using the generated flow entries, the MFEs are able to forward and route packets between network elements of the logical network that are coupled to the MFEs. In some embodiments, however, some or all of the MFEs are not flow-based software forwarding elements, but instead process packets based on configuration data that is generated by their respective local controllers. In some embodiments, the local controllers receive the same data from the control plane irrespective of the type of MFEs they manage, and perform different data conversions for different types of MFEs.

Returning to FIG. 3, the control plane distributes the logical forwarding data of the L2 logical switches 105 and 110 to the TOR switches 130 and 140 in order for the TOR switches to implement these logical switches. Additionally the control plane distributes the logical forwarding data of the logical routing components to the TOR switch 130, in order for this switch to implement the logical router and connect the physical workload attached to the TOR switch 130 to the virtual machines VM1 and VM2, as well as the physical workload attached to the TOR switch 140. The control plane also assigns the PTEP 315 as one of the MFEs that perform routing operations for the TOR switch 140 in order to connect the physical workload attached to this TOR switch to the virtual machines VM1 and VM2 as well as the physical workload attached to the TOR switch 130.

In some embodiments, the control plane distributes the logical forwarding data of the logical forwarding elements directly to the MHFEs (e.g., TOR switches) using an open source database protocol such as OVSDB protocol. In some other embodiments the control plane distributes the forwarding data first to one or more MHFE controllers using the NETCPA protocol, which is a proprietary protocol (a VXLAN control plane protocol). In some such embodiments, the MHFE controllers subsequently translate the logical forwarding data to the open source protocol (e.g., OVSDB protocol) that is recognizable by the TOR switches and distribute the forwarding data to the TOR switches using the open source protocol.

The distributed router 220, as shown in FIG. 3, is implemented across the MFEs 315 and the gateway machines 330 and 335 (as well as the TOR switch 130 which is not shown). That is, the datapaths (e.g., in the MFEs 315, or in a different form factor on the gateways and MHFEs) all include the necessary processing pipelines for the DR 220 (and the transit logical switch 310 illustrated in FIG. 2). Unlike the distributed router 220, each of the two service routers 230 and 240 operates on a single gateway machine. Specifically, the SR 230 shown in the figure operates on the gateway machine 330, while the SR 240 operates on the gateway machine 335.

In some embodiments, the gateway machines 330 and 335 (also called edge nodes in some embodiments) are host machines similar to the host machines Host 1 and Host 2, which host service routers rather than user VMs. As shown in the figure, each of the gateway machines 330 and 335 includes an MFE 315 as well, which are similar to the other MFEs operating on the other host machines that implement the logical forwarding elements of the logical network 100. In the illustrated gateway machines 330 and 335, the SRs are shown as separate from the MFEs that operate on the gateway machines.

Different embodiments, however, may implement the SRs differently. Some embodiments implement the SRs as VMs (e.g., when the MFE is a software switch integrated into the virtualization software of the gateway machine), in which case the SR processing is performed outside of the MFE. Additionally, some embodiments implement the SRs on an edge MHFE (e.g., a hardware VTEP). In some such embodiments, the edge hardware VTEP plays the role of a gateway machine and connects the logical network (also implemented by the VTEP) to external network(s).

On the other hand, some embodiments implement the SRs as virtual routing and forwarding (VRFs) elements within the MFE datapath (when the MFE uses DPDK for the datapath processing). In either case, the MFE treats the SR as part of the datapath, but in the case of the SR being a VM (or other data compute node) separate from the MFE, the MFE sends the packet to the SR for processing by the SR pipeline (which may include the performance of various services). As with the MFEs on the host machines Host 1 and Host 2, the MFEs of the gateway machines, as described above, are configured to perform all of the distributed processing components of the logical network.

The SRs of some embodiments may operate in an active-active or active-standby mode, depending on whether any stateful services (e.g., firewalls) are configured on the logical router. When stateful services are configured, some embodiments require only a single active SR. In some embodiments, the active and standby service routers are provided with the same configuration, but the MFEs operating on the host machines are configured to send packets via a tunnel to the active SR (or to the MFE of the gateway machine that implements the active SR). Only if the tunnel is down will the MFE send packets to the standby SR.

As described above, the different MFEs and MHFEs that implement the logical forwarding elements use a tunnel protocol in order to exchange the network data between the different elements of the logical network 100. In some embodiments, the control plane (e.g., one or more controller computers of the CCP cluster) distributes configuration data to the MFEs and MHFEs (e.g., through separate controllers of MFEs and MHFEs), which includes instructions on how to set up tunnels between the MFEs and MHFEs. For instance, the configuration data specifies the location (e.g., IP address) of each MFE as a tunnel endpoint. In some embodiments, each TOR switch is also a tunnel endpoint.

The TOR switch of some embodiments, after receiving the endpoint addresses (in the configuration data), stores the tunnel endpoint addresses of the other MFEs and MHFEs that implement the logical forwarding elements and their different logical ports in a particular tunnel endpoint locator table. The tunnel endpoint locator table is one of several database tables that are configured on the TOR switch using a database schema (e.g., OVSDB schema, hardware VTEP database schema, etc.). The distributed configuration data, therefore, enables the TOR switch to locate other tunnel endpoints (through their IP addresses) and establish the tunnels between the TOR switch and the other endpoints. Configuring L3 hardware switches to implement distributed logical routers and to enable the hardware switches to locate the other endpoints of one or more logical networks is discussed in great detail in the U.S. patent application Ser. No. 14/815,839, filed Jul. 31, 2015, now issued as U.S. Pat. No. 9,847,938, which is incorporated herein by reference.

As described above, in some embodiments, a central control plane (CCP) cluster (e.g., a particular controller in the CCP cluster) selects one or more PTEPs for handling the logical routing for L2 hardware switches and programs the tunneling IP (VTEP-IP) addresses of these chosen PTEPs onto these hardware switches. These PTEPs serve as candidate intermediate destination tunneling endpoints for distributed routing. For an L2 hardware switch to send network traffic that needs to be routed (i.e., L3 packets) onto a particular logical router, the hardware switch tunnels the L3 packet to one of the designated PTEPs and then the PTEP routes the packet towards its final destination (e.g., to an external next physical hop, to an end machine associated with a logical port of an L2 logical switch, to a logical port of a different logical router as the next hop in the logical network, etc.).

In some embodiments, a PTEP is an MFE that is selected and configured to implement one or more logical routers for one or more L2 hardware switches in one or more overlay logical networks. In some embodiments, each overlay logical network has its corresponding set of PTEPs, and different logical networks can have different sets of PTEPs. In some embodiments, the network controller selects the MFEs to serve as PTEPs in a manner that balances traffic load or computation load across different host machines. In some embodiments, an overlay logical network can have multiple PTEPs, and an L2 hardware switch has multiple PTEPs to choose from for sending L3 packets. In some embodiments, an L2 hardware switch tunnels an L3 packet to a set of assigned PTEPs to handle the L3 processing for the hardware switch. In some such embodiments, one of PTEPs is selected to receive the L3 packet and perform its routing operation. Such a selection can be based on load balancing algorithms (e.g., based on a hash value from the packet header) in some embodiments.

Figure 4:
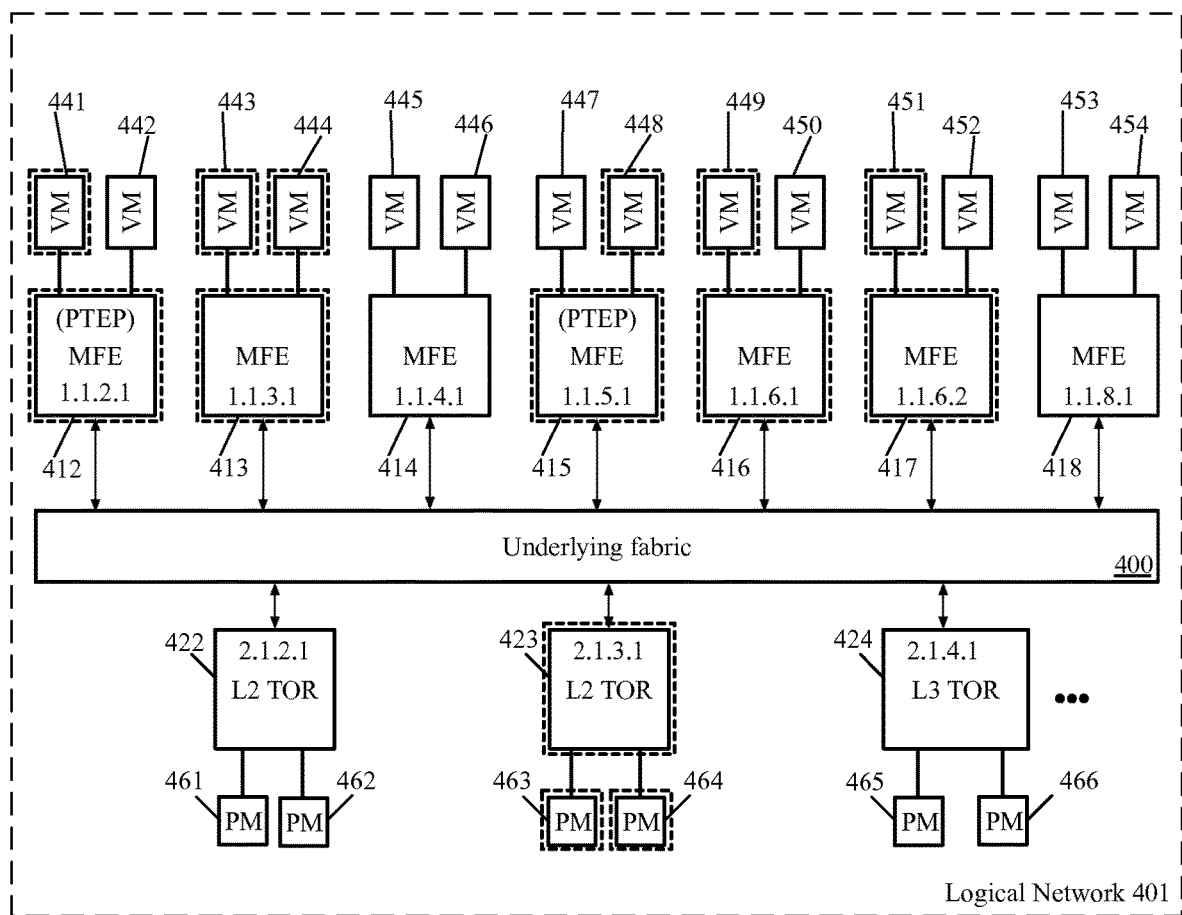
FIG. 4 illustrates a set of PTEPs that are selected and assigned for an overlay logical network, the network elements of which share the same network virtualization infrastructure with other logical networks.

FIG. 4 illustrates a set of PTEPs that are selected and assigned for an overlay logical network 401, the network elements of which share the same network virtualization infrastructure 400 with other logical networks. The network virtualization infrastructure 400 interconnects the managed forwarding elements (MFEs) 412-418 that operate on a set of host machines (not shown for simplifying the figure). The set of host machines that executes the MFEs 412-418, also hosts the virtual machines (VMs) 441-454 (in the illustrated example, each host machine hosts a couple of VMs). The network virtualization infrastructure 400 is also connected to a set of L2 and L3 hardware switches (TOR switches) 422-424. The set of TOR switches bridges different sets of physical machines 461-466 into the overlay logical network 401 operating on the network infrastructure 400.

As illustrated, the overlay logical network 401 (e.g., a hosting system tenant's network) includes the VMs 441, 443, 444, 448, 449, and 451. This set of VMs resides on the same host machines that execute the MFEs 412, 413, 415, 416, and 417. Each of these MFEs is configured (e.g., by the control plane) to implement the logical forwarding elements (e.g., L2 and L3 logical switches) through which the end machines of the logical network logically connect. In addition, the PMs 463 and 464 that are connected to the L2 TOR switch 423 are also bridged to the logical network 401 through this TOR switch. Therefore, the L2 logical forwarding elements of the logical network 401 are also implemented on this TOR switch (e.g., through a set of forwarding tables of a database instantiated on the TOR switch).

However, the TOR switch 423 is not capable of implementing L3 forwarding elements of the logical network (e.g., different routing components (DR and TLS) of a distributed logical router of the logical network), because the set of forwarding tables that are related to the logical routing components (e.g., Logical Router table of hardware VTEP database schema) is not defined for the TOR switch. That is, the hardware VTEP database that is instantiated on the L2 TOR switch 423 only includes the forwarding tables required to implement the logical L2 switches of the logical network, and lacks the forwarding tables required to implement the logical L3 switches (i.e., logical routers) of the logical network.

Therefore, in order to logically connect the PMs 463 and 464 to other end machines of the logical network, the TOR switch 423 should use a set of PTEPs that perform L3 processing for the packets sent from or received by these PMs. The figure shows that the MFEs 412 and 415 are assigned (e.g., by a controller computer of the CCP cluster) as the set of PTEPs that performs such a duty for the TOR switch 423. In other words, the PTEPs 412 and 415 perform distributed routing operations for the TOR switch 423. In some embodiments, as described before, a controller selects host machines to serve as PTEPs in a manner that balances traffic load or computation load across different host machines (e.g., based on a hash value extracted form the packet headers).

In some embodiments, each selected host machine that serves as a PTEP also hosts at least one VM that is connected to the logical network for which the PTEP is selected (as illustrated in the example of FIG. 4). However, in some other embodiments, a PTEP selected for an overlay logical network need not be a host machine that hosts any VMs in that particular overlay logical network. Additionally, as described above, the selected PTEPs of some embodiments operate on dedicated machines that do not host any end machine of any logical network. Furthermore, in some embodiments, some or all of the PTEPs of a logical network also handle BUM traffic (i.e., replication of broadcast, unknown unicast, multicast packets) for hardware switches that are not capable of handling BUM traffic. Handling the BUM traffic by a set of PTEPs for one or more logical networks is described in great detail in the U.S. patent application Ser. No. 14/231,245, filed Mar. 31, 2013, now issued as U.S. Pat. No. 9,794,079, which is incorporated herein by reference.

One of ordinary skill in the art would realize that the number of network elements depicted in the figure are exemplary and a logical network may include many more virtual machines and other compute nodes (e.g., containers). Additionally, each MFE operating on a host machine may connect to many more data compute nodes that reside on the same host machine. Similarly, a logical network in a real hosting system (e.g., a datacenter) may include many more MFEs that are assigned as PTEPs and may logically connect to many more hardware switches (e.g., third-party TOR switches) that are connected to numerous physical machines.

Figure 5:
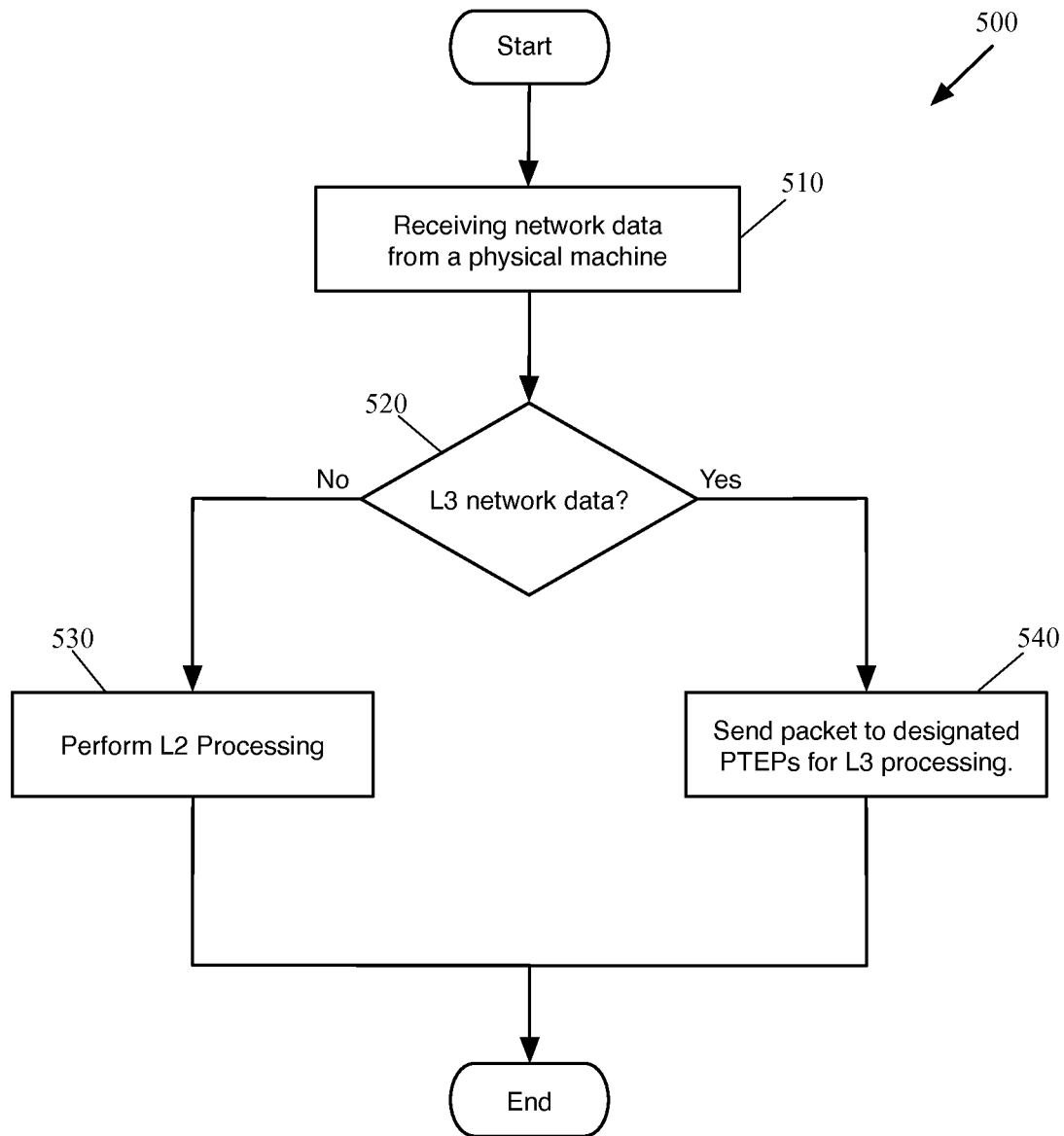
FIG. 5 conceptually illustrates a process of some embodiments that an L2 hardware switch performs for processing different logical network packets received from the physical workload connected to the hardware switch.

For some embodiments, FIG. 5 conceptually illustrates a process 500 performed by an L2 hardware switch, for processing different logical network packets received from the physical workload connected to the hardware switch. In some embodiments an L2 hardware switch does not perform the process 500 for the incoming packets that arrive at the hardware switch (i.e., packets that are received from other end machines and are destined for physical workload attached to the hardware switch). This is because in some such embodiments, the packet processing pipelines of the logical network are entirely performed at the first hop. That is, the first Managed forwarding element (hardware or software) that receives an L3 packet, performs all the necessary first-hop switching for the different L2 and L3 switches that the managed forwarding element implements. As such, when an incoming packet arrives at the hardware switch, all of the required L3 processing has already been performed on the incoming packet.

As shown, the process 500 begins by receiving (at 510) an outgoing packet from a physical machine that is connected to the TOR switch. The outgoing packet could be destined for an end machine (physical machine, virtual machine, etc.) that is connected to the same logical switch, to which the originator physical machine of the packet is connected. That is, the outgoing packet is sent to a destination end machine that is on the same subnet that the originator of the packet is on (which is the subnet associated with the logical switch to which both of these machines are connected).

Conversely, the outgoing packet might be destined for an end machine that is connected to a different logical switch of the logical network (e.g., on a different subnet) than the logical switch to which the sender machine is connected. The outgoing packet might also be destined for an end machine that belongs to a different logical network on the same or different hosting system, or an end machine that belongs to an external physical network. When the final destination of the packet is a machine that is not coupled to the same logical switch to which the originator of the packet is connected, the packet is an L3 packet and requires L3 processing.

The process 500, after receiving the outgoing packet, determines (at 520) whether the packet is an L2 packet, or an L3 packet. In some embodiments, an L2 packet is a packet, the destination MAC address of which is a MAC address of one of the ports of the switch that receives the packet. In some embodiments, an L3 packet is a packet, the destination MAC address of which is does not belong to any of the ports of the switch that receives the packet.

The process of some embodiments determines whether the packet is an L2 or an L3 packet by analyzing the destination address (e.g., destination network address in the IP header) of the packet and determining whether the source and destination IP addresses are on the same subnet of the logical network. When the process determines that the packet is an L2 packet, the process begins to perform (at 530) the necessary L2 processing on the packet. That is, the process executes the pipeline of the logical switch to which the destination machine is coupled, on the L2 hardware switch (by using the required forwarding data stored in the database tables that are instantiated on the hardware switch). The process then ends.

On the other hand, when the process determines that the packet is an L3 packet, the process sends (at 540) the packet to a PTEP that is designated to perform the necessary L3 functionalities of the packet for the hardware switch. The process then ends. As will be discussed in more detail below by reference to FIG. 8, when the packet is determined to be an L3 packet (i.e., the packet should be routed through a logical router of the logical network), the destination network layer address (destination IP address) of the packet is changed to one of the logical ports of a logical router. The logical router port is a logical port that is coupled to the logical switch associated with the originator machine of the packet.

However, because such a destination MAC address is not known to the hardware switch (because the hardware switch does not implement any of the logical routing components), the hardware switch sends the packet to a set of managed forwarding elements that are defined as the destination of the packet when the destination MAC address of the packet is unknown. This set of managed forwarding elements includes the PTEPs that perform distributed routing processing on the packet on behalf of the hardware switch. In some embodiments, the same PTEPs are also assigned to handle BUM traffic for the hardware switch.

Some embodiments perform variations of the process 500. The specific operations of the process 500 may not be performed in the exact order shown and described. Additionally, the specific operations may not be performed in one continuous series of operations, and different specific operations may be performed in different embodiments.

Figure 6:
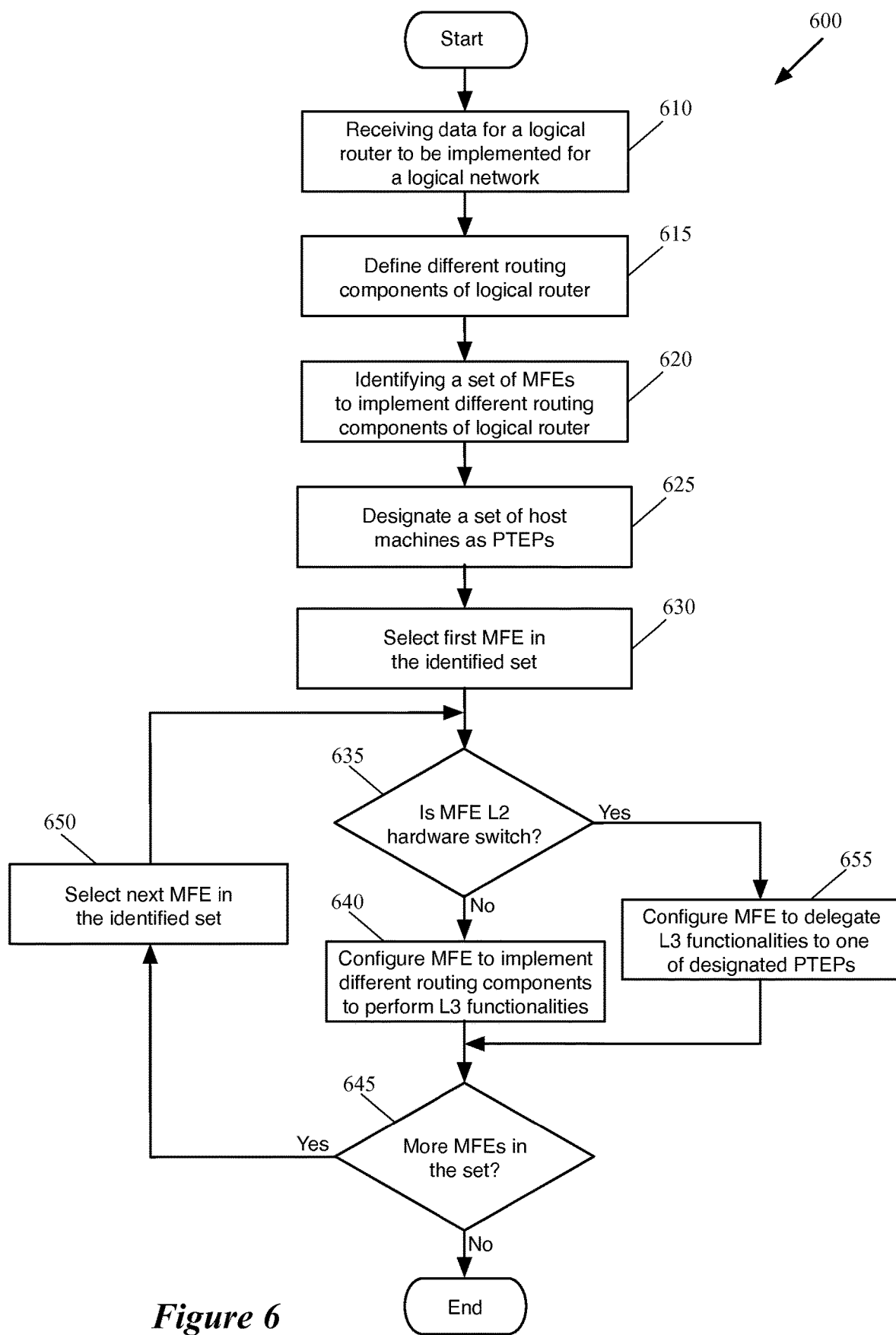
FIG. 6 conceptually illustrates a process of some embodiments for configuring a distributed logical router on different managed forwarding elements that implement different logical forwarding elements of a logical network.

FIG. 6 conceptually illustrates a process 600 of some embodiments for configuring a distributed logical router on different managed forwarding elements (managed hardware and software forwarding elements) that implement different logical forwarding elements (LFEs) of a logical network. Such configuration entails configuring L2 hardware switches to delegate the distributed logical routing task to a set of PTEPs as well. In some embodiments, process 600 is performed by a control plane of a datacenter (e.g., one or more central controller computers, or one or more controller applications operating on one or more controller computers of a CCP cluster that manages the networks of a datacenter). The control plane of some embodiments performs the configuration process and then uses a local controller machine or application to distribute customized configuration data to each MFE that implements the configured logical router.

As shown, the process 600 begins by receiving (at 610) a specification of a logical router. The specification of the logical router is based on a user input (e.g., input from a network administrator, a tenant, etc.) that defines the logical router. In some embodiments, this specification includes definitions of any services the logical router should provide, whether the logical router will be configured in active-active or active-standby mode (though some embodiments automatically use active-active mode unless stateful services are configured), how many uplinks are configured for the logical router, the IP and MAC addresses of the uplinks, the L2 and L3 connectivity of the uplinks, the subnets of any southbound interfaces of the logical router, any static routes for the routing information base (RIB) of the logical router, as well as other data.

The process then defines (at 615) the different routing components of the logical router based on the received specification. Specifically, the process defines a distributed router (DR) and a set of service routers (SRs) based on the specification of the logical router and assigns different MAC and IP addresses for the different ports of these routing components. Defining the different routing components and assigning network (IP) and data link layer (MAC) addresses to the different logical ports of the routing components is described in greater detail in the U.S. patent application Ser. No. 14/814,473, filed Jul. 30, 2015. Essentially, the process of some embodiments uses the southbound interface configuration of the logical router for the southbound interface of the distributed router (DR). That is, the IP addresses and MAC addresses for the different southbound logical ports of the DR are those specified for the logical router.

The process 600 also assigns each uplink specified for the logical router to a gateway machine and defines a service router (SR) on the gateway machine. For each SR, the process uses the configuration for the uplink assigned to that gateway machine as the configuration for the northbound interface of the SR. This configuration information includes the IP and MAC address of the uplink, as well as any uplink-specific policies. In defining the different routing components, the process additionally defines a unique transit logical switch to connect the defined SRs and DR. Some embodiments require that the subnet assigned to the transit logical switch be unique among the logical network topology. The process also assigns a northbound interface to the DR and assigns both a MAC address and an IP address to this interface. The process also assigns southbound interfaces to the SRs with separate MAC and IP addresses (only the active-standby SRs may share the same IP address). In some embodiments, the IP addresses of the northbound port of the DR and the southbound ports of the SRs are in the same subnet that is assigned to the transit logical switch.

The process then identifies (at 620) a set of MFEs (e.g., hardware switches or hardware VTEPs, hypervisors or software VTEPs, etc.) to implement the defined routing components of the logical router. As described above, the identified set of MFEs includes the MFEs that implement different LFEs of the logical network through which the end machines (e.g., virtual machines, physical machines, etc.) of the logical network are logically connected. In other words, the MFEs include hardware switches (L2 and L3 switches) that extend the logical network to physical workloads connected to the hardware switches, as well as software switches (e.g., operating in the hypervisors of host machines) that extend the logical network to data compute nodes (e.g. virtual machines, containers, etc.) connected to the software switches.

At 625, the process designates a set of host machines (i.e., the MFEs operating on the host machines) as physical tunnel endpoints (PTEPs) to perform logical routing operations for one or more L2 hardware switches in the identified set of MFEs. As described above, in some embodiments, each designated PTEP also hosts at least one data compute node connected to a logical switch. In some embodiments, at least one of the designated PTEPs is a host machine or another dedicated machine that does not host any compute node that is logically connected to the logical network that includes the logical router. Furthermore, in some embodiments, some or all of the designated PTEPs also handle the BUM traffic (i.e., replication of broadcast, unknown unicast, multicast packets) for the identified MHFEs that are not capable of message replication.

The process 600 then starts the processing of the identified MFEs by selecting (at 630) the first MFE in the set and determining (at 635) whether the selected MFE is an L2 hardware switch. As described above, an L2 hardware switch is a hardware switch that is incapable of implementing the defined routing components of the logical router. In other words, the necessary forwarding tables that specify how to implement the routing components of the logical router (e.g., the logical router table) are not defined in the database schema of an L2 hardware switch.

When the process determines (at 635) that the selected MFE is not a L2 MHFE, i.e., the selected MFE is capable of L3 routing operations, the process configures (at 640) the MFE to implement the various routing components of the logical router in order to perform the routing functionalities of the logical router. Configuring the managed software forwarding elements or MSFEs (e.g., forwarding elements operating on hypervisor of host machines) to implement the various routing components of a logical router is described in ample detail in the U.S. patent application Ser. No. 14/814,473, filed Jul. 30, 2015, while configuring the L3 MHFEs (e.g., third-party TOR switches) to implement the different routing components of a logical router is described in great detail in the U.S. patent application Ser. No. 14/815,839, filed Jul. 31, 2015. Essentially, the control plane configures the MFE to implement the DR and the TLS of the logical router (among other logical switches of the logical network) by populating a set of forwarding tables instantiated on the MFE with the required forwarding data.

After configuring the MFE, the process determines (at 645) whether there are more managed forwarding elements (hardware or software) in the identified set of MFEs. If the process determines that there are more MFEs in the set of MFEs, the process selects (at 650) the next MFE in the set and returns to operation 635 to determine the type of the MFE and to process the MFE based on its type. If the process determines that there is no more MFE left in the identified set of MFEs, the process ends.

When the process determines (at 635) that the selected MFE is an L2 MHFE (e.g., a hardware switch that is not able to implement the defined logical routing components), the process configures (at 655) the MFE to delegate the routing functionalities to one of the designated PTEPs. That is, the process populates a particular set of forwarding tables of a database instantiated on the hardware switch, such that the configuration data instructs the hardware switch to forward an L3 packet to the designated set of PTEPs. One of the PTEPs performs the necessary routing operations on the L3 packet on behalf of the hardware switch thereafter. Populating the database tables on the hardware switch is described in more detail below by reference to FIG. 8. The process then proceeds to operation 645 to determiner whether there are more MFEs in the set of identified MFEs.

Some embodiments perform variations of the process 600. The specific operations of the process 600 may not be performed in the exact order shown and described. For example, some embodiments first determine whether any L2 switch exists in the set of identified managed switches. When no L2 switch is found in the identified set, some such embodiments do not designate any PTEP for the identified set of switches to perform routing (a set of PTEPs may still be needed to handle BUM traffic for any hardware switch that cannot handle BUM traffic). Additionally, the specific operations may not be performed in one continuous series of operations, and different specific operations may be performed in different embodiments.

As described above when a user configures a logical router, the control plane uses this configuration to define a DR and a set of SRs and to configure the SRs and the DR on a set of managed forwarding elements participating in the logical network. For instance, the logical router 115 of FIG. 1 has four interfaces (two ports connected to the logical switches' ports, and two uplink ports). However, as shown in FIG. 2, the distributed control plane implementation of the logical router includes a DR with three logical ports (two of which are connected to the logical switches 105 and 110, and one of which connected to the TLS 210) and two SRs 230 and 240 that each has two logical ports (a total of seven ports). The IP and MAC addresses and other configuration details assigned to the four interfaces as part of the logical router configuration are used to generate the configuration for the various components of the logical router.

In addition, as part of the configuration, some embodiments generate a forwarding information base (FIB) for each of the logical router components based on the RIB defined for the logical router and the definition of the logical router component. That is, although the administrator defines only a single logical router, the management (control) plane of some embodiments generates separate RIBs and/or FIBs for the DR and for each of the SRs. For the SRs of a PLR, the control plane in some embodiments generates the FIB initially, but the physical implementation of the SR also runs a dynamic routing protocol process (e.g., BGP, OSPF, etc.) to supplement the FIB locally.

In some embodiments, the DR is always located on the southbound side (i.e., facing the data compute nodes and physical machines of the logical network, rather than facing the external physical network) of the logical router implementation. The southbound ports of the DR, therefore, are connected to different logical switches that have their other ports connected to different virtual and physical machines that reside in host machines or connected to managed hardware forwarding elements, or alternatively have their ports connected to other forwarding elements. The northbound interface of the DR, on the other hand, couples to the transit logical switch that is part of the logical router.

Figure 7:
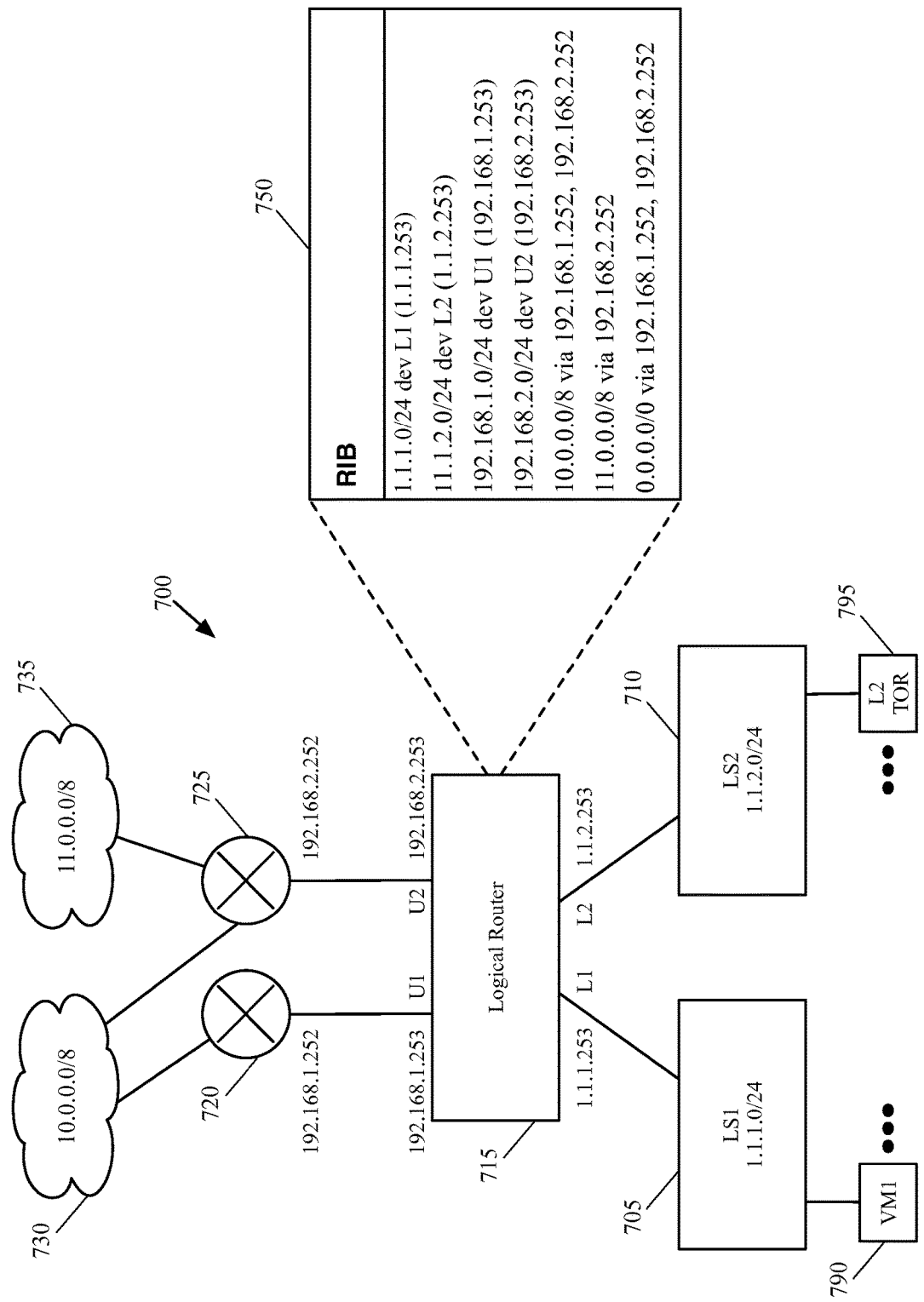
FIG. 7 conceptually illustrates a detailed configuration of a logical network topology that includes the network addresses and interfaces assigned by a user.

FIG. 7 conceptually illustrates a detailed configuration of a logical network topology 700 that includes the network addresses and interfaces assigned by a user. As shown, the logical switches 705 and 710 are each assigned their own subnets, 1.1.1.0/24 and 1.1.2.0/24, and all of the data compute nodes and MHFEs attached to the logical switches 705 and 710 have IP addresses in the corresponding subnet. The logical router 715 has an interface L1 to the first logical switch 705. The interface L1 has an IP address of 1.1.1.253 that is the default gateway for the data compute nodes and MHFEs in the subnet 1.1.1.0/24, which includes the VM 790. The logical router 715 also has a second interface L2 to the second logical switch 710. The interface L2 has an IP address of 1.1.2.253 that is the default gateway for the data compute nodes and MHFEs in the subnet 1.1.2.0/24, which includes the L2 TOR switch 795.

The northbound side of the logical router 715 has two uplinks, U1 and U2. The first uplink U1 has an IP address of 192.168.1.253 and connects to a first physical router 720 with an IP address of 192.168.1.252. The second uplink U2 has an IP address of 192.168.2.253 and connects to a second physical router 725 with an IP address of 192.168.2.252. The physical routers 720 and 725 are not actually part of the logical network (e.g., logical network 100), but rather connect the logical network to the external networks 730 and 735. The first physical router 720 connects to the subnet 10.0.0.0/8, while the second physical router 725 connects to both of the subnets 10.0.0.0/8 and 11.0.0.0/8. Although not shown, each of the logical ports of the logical router 715 is also assigned a separate data link layer (MAC) address.

Based on these example addresses, the RIB 750 defines the different routings performed by the router 715. Specifically, the RIB includes four connected routes based on the subnets configured on the southbound and northbound interfaces of the logical router. These four connected routes include a route that egresses from logical port L1 for any packet that has a destination IP address that is in the subnet of LS1; a route that egresses from the logical port L2 for packets with destination IP addresses that belong to the subnet of LS2; a route that egresses the logical port U1 for packets with destination IP addresses that belong to the subnet of U1 and/or physical router 720; and a route that egresses from the logical port U2 for packets with destination IP addresses that belong to the subnet of U2 and/or physical router 725.

The RIB also includes three other static routes that are not directly connected to the logical ports of the logical router. These routes include, any packet with the subnet IP address of 10.0.0.0/8 is to be routed from either logical port U1 or logical port U2; any packet with the subnet IP address of 11.0.0.0/8 is to be routed from logical port U2; and a default route which is either through the logical port U1 or the logical port U2 of the router.

As described above in order to configure an L2 hardware switch to offload L3 packets destined for a logical port of a logical router, some embodiments configure a set of database tables (e.g., forwarding tables of the forwarding elements) on the L2 MHFE using an open source protocol (e.g., an open vSwitch database management (OVSDB) protocol), which is recognizable by the MHFE. Such an open source protocol requires minimal software to execute on the MHFE (e.g., TOR switch) and to enable the MHFE to implement the logical network forwarding elements (e.g., logical L2 switches) in order to communicate with the other machines connected to the logical network as well as other external networks.

Some embodiments use a database schema (e.g., OVSDB schema, hardware VTEP database schema) to propagate a particular set of the tables with required data to configure the L2 MHFEs to forward the L3 packets they receive to a set of PTEPs. One such table includes the physical locator data of the PTEPs that implement the different routing components (i.e., distributed and service routers) of the logical router. The physical locator data, in some embodiments, specify the tunnel (e.g., Virtual Extensible LAN (VXLAN) tunnel) endpoint addresses (i.e., IP addresses) of the PTEPs. By locating the endpoints of the PTEPs, the L2 MHFEs are able to establish tunnels between themselves and the PTEPs and exchange the L3 packets through the established tunnels (e.g., VXLAN tunnels).

Figure 8:
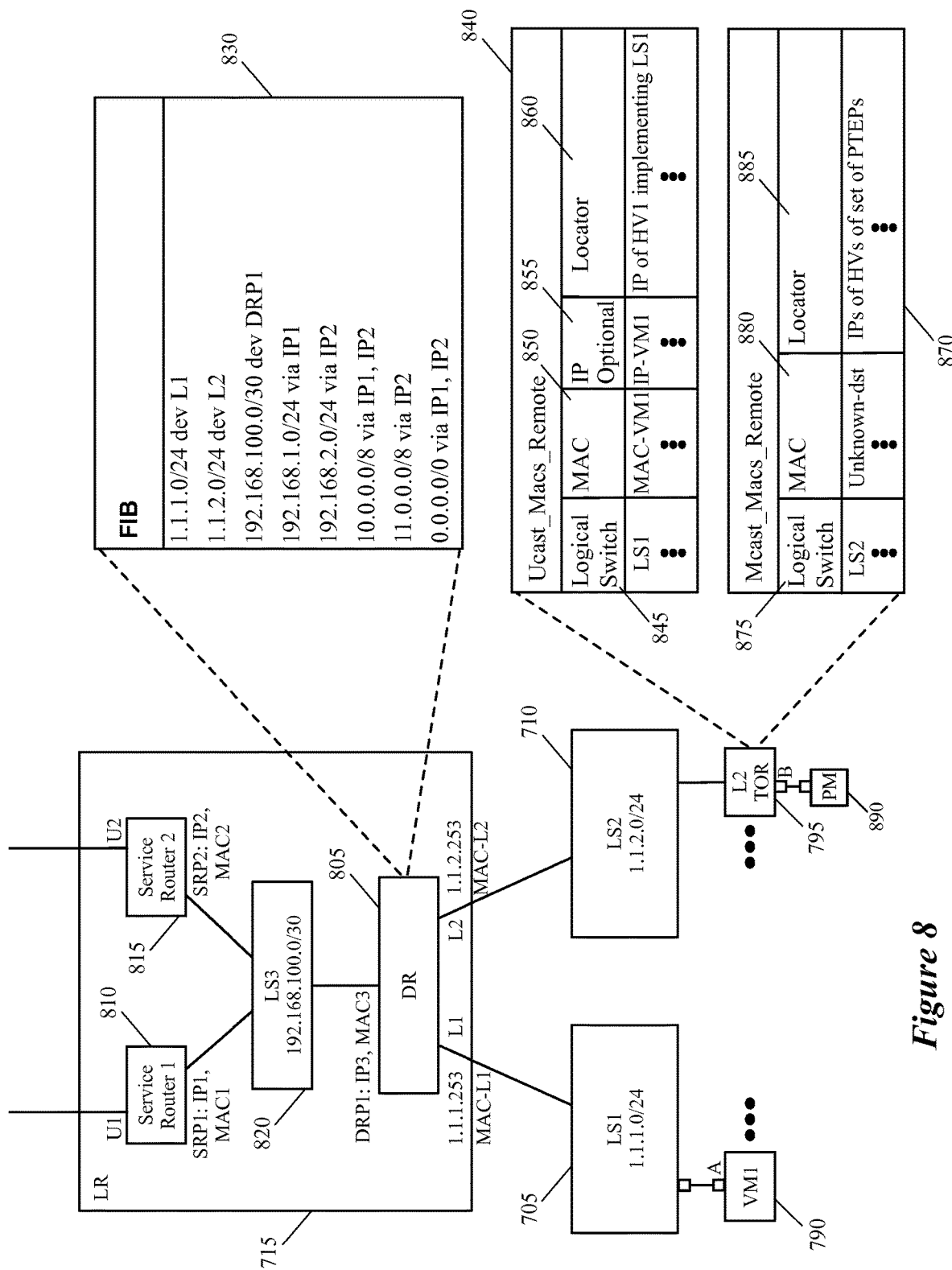
FIG. 8 illustrates the configuration of the logical router of FIG. 7 and how the control plane configures the tunnel endpoint locators on an L2 MHFE to forward L3 packets destined for the logical router to a set of designated PTEPs.

FIG. 8 illustrates the configuration of the logical router 715 of FIG. 7 and how the control plane configures the tunnel endpoint locators on an L2 MHFE to forward L3 packets destined for the logical router 715 to a set of designated PTEPs. The L2 MHFE 795 shown in the figure is a hardware VTEP that cannot perform the distributed router functionalities, and hence these routing functionalities must be offloaded to a PTEP.

As shown, the logical switches 705 and 710 are configured as defined by the user configuration. However, the control plane defines a distributed routing component (DR) 805, two service routing components (SRs) 810 and 815, and a transit logical switch (TLS or LS3) 820 for the logical router 715. The DR is assigned the two southbound interfaces of the logical router 715, which connect to the logical switches 705 and 710. The transit logical switch 820 (L3) is assigned a subnet of 192.168.100.0/30. Some embodiments require the subnet assignment of each logical switch be unique among the logical switches that logically connect (directly or indirectly) the logical router 715. Each of the three control plane routing constructs (i.e., the DR 805, the SR 810, and the SR 815) also includes an interface that connects to the TLS 820, and has an IP address in the subnet of the transit logical switch. The northbound interfaces U1 and U2 are assigned to the two SRs 810 and 815, the configuration of which is described below.

A DR (e.g., 805) of a logical router (e.g., 715) in some embodiments is configured as follows. The southbound interfaces of the DR are configured in the same way as the southbound interfaces of the logical router. That is, each southbound logical port is assigned separate IP and MAC addresses. These logical ports are the ports that are associated with the logical switches (e.g., each logical port of the logical router is associated with a different logical switch) in the logical network topology. The DR of some embodiments is allocated a single northbound interface, which is assigned an IP address and a MAC address as well. Assuming the logical router has one or more SRs, the northbound interface of the DR connects to a transit logical switch.

The FIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces are user-defined logical domains to which data compute nodes and physical machines connect (or other transit logical switches located between the DR of a PLR and any TLRs that connect to the PLR in multi layer logical routers).

In addition, any static route that egresses from an uplink of the logical router is included in the FIB of the DR; however, these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR's southbound interface]". Static routes that egress from a southbound interface of the logical router, on the other hand, are included in the FIB of the DR unmodified.

The control plane in some embodiments generates the FIB 830 based on the configuration data and the RIB of the logical router 715 (as shown in FIG. 7), which includes the different routes illustrated in the figure. The illustrated routes include three connected routes, for the logical switch domains connected to the DR (1.1.1.0/24, 1.1.2.0/24, and 192.168.100.0/30). In addition, the subnet on which the first uplink is located (192.168.1.0/24) is reached via the southbound interface of the first SR 810 (IP1), while the subnet on which the second uplink is located (192.168.2.0/24) is reached via the southbound interface of the second SR 815 (IP2).

In addition, three static routes have been added by the user for the logical router 715, which the control plane automatically modifies for the DR 805. Specifically, the static routes include the network 10.0.0.0/8 via the southbound interface of either of the SRs, and the network 11.0.0.0/8 via the southbound interface of SR2. Lastly, default routes pointing to these same southbound interfaces are included. As shown, the IP addresses IP1, IP2, and IP3 that are created by the control plane for the ports of the logical router constructs that interface the TLS are all in the subnet 192.168.100.0/30.

In some embodiments, in addition to configuring the FIB of the DR, the control plane also assigns MAC addresses to the DR interfaces. In some embodiments, some or all of the physical routing elements (e.g., software modules) in the physical network that implement the DR functionality only support a single MAC address. In this case, because the MAC of a DR port may come from that of a logical router port visible to users, this imposes requirements on how the control plane allocates MAC addresses for the logical router ports. Thus, in some embodiments, all DR/SR ports that connect to any logical switch that has user data compute nodes or SRs must share a common MAC address. In addition, if a DR/SR port is connected to another DR/SR or to a physical network, this port is assigned a unique MAC address.

Similar to the DR of a logical router, the control plane also configures each SR of the logical router with a separate FIB (not shown) and the required interfaces. As described above, in some embodiments SRs may deliver services (i.e., functionalities beyond simply routing, such as NAT, firewall, load balancing, etc.) and provide the connection between the logical network and external physical networks. As shown in FIG. 8, since the logical router 715 has two uplinks, the control plane defines two service routers 810 and 815. Each of these SRs is assigned a southbound interface, with different IP and MAC addresses (as the SRs are in an active-active configuration). The IP addresses IP1 (for the first SR 810) and IP2 (for the second SR 815) are in the subnet 192.168.100.0/30, as is IP3 (the northbound interface of the DR 805).

For each southbound interface of the logical router, some embodiments add a route for the corresponding network to the FIB of each SR. This route points to the northbound DR interface as its next-hop IP address. Furthermore, any other routes configured for the logical router that egress from the southbound interface are copied to the SR with the same northbound DR interface as the next-hop IP address. On the other hand, a static route of the logical router that egresses from an uplink (e.g., U1 or U2) is copied to the FIB of the SR. In addition, the SRs (of a top-level logical router) may learn dynamic routes and place the learned dynamic routes in their FIB (though some embodiments perform this locally, without involving the centralized controller system in the control plane).

As described above, some embodiments implement the distributed routing component of the logical router in a distributed manner across the different MSFEs and MHFEs. Some of these embodiments implement each of the service routing components of the logical network on an edge node (e.g., a gateway machine), which is a machine at the edge of the network (e.g., the datacenter network), in order to communicate with one or more external networks. The control plane of some embodiments distributes configuration data of the logical forwarding elements to the MSFEs in a manner that is different than to the MHFEs. The different manners of configuration and forwarding data distribution to MSFEs and MHFEs are described in detail in the U.S. patent application Ser. Nos. 14/814,473 and 14/815,839.

In some embodiments, the control plane computes and distributes the logical configuration and forwarding data to each local controller that operates on a host machine using a proprietary protocol (e.g., NETCPA). In some such embodiments, the local controller operating on the host machine generates a set of forwarding tables for the MSFE that runs on the same host machine and distributes the generated data to the MSFE for implementing the logical forwarding elements of the logical network (e.g., by forwarding the logical network data to other end machines executed on the same host machine, or establishing tunnels to other MSFEs and/or MHFEs and forwarding the network data through the established tunnels to those MSFEs and MHFEs).

In some embodiments, the control plane computes and distributes the logical configuration and forwarding data to each MHFE (L2 or L3) using an open source protocol that is recognizable and used by the MHFE (e.g., an open vSwitch database management (OVSDB) protocol). In some other embodiments, the control plane distributes the logical network data to a particular controller that manages the MHFE using a proprietary protocol (e.g., NETCPA) and the particular controller distributes the data to the MHFE using an open source protocol such as OVSDB protocol. The controllers (local controller operating on the host machine, particular controller managing the MHFE, etc.) of some embodiments are applications that are instantiated on either the host machines or other dedicated controller machines.

In order to configure and manage the different components of a logical router as well as other logical forwarding elements (e.g., logical L2 switches) of a logical network on an MHFE, some embodiments configure the MHFE with a set of database tables (e.g., forwarding tables of the forwarding elements) that is populated using a particular database schema (e.g., OVSDB schema, hardware VTEP database schema, etc.) that is recognizable and used by the MHFE. Such an open source protocol requires minimal software on the MHFE to enable the implementation of the logical network forwarding elements (e.g., logical L2 and L3 forwarding elements) in order to communicate with the other machines connected to the logical network as well as other external networks.

For an L2 MHFE, some embodiments propagate a particular set of database tables with the physical locator addresses (i.e., IP addresses) of the MFEs (hardware and software) that implement (1) the different logical switches' ports that are associated with the end machines of the logical network, and (2) the logical router ports that receive the L3 packets from the MHFE. The physical locator information, in some embodiments, specifies the tunnel endpoint locations (e.g., VXLAN tunnel endpoints or VTEPs). These tunnel endpoint locator tables, which are also referred to as Ucast_Macs_Remote and Mcast_Macs_Remote tables in some embodiments, are for specifying the next destination of (i) a unicast packet with a unique destination MAC address, and (ii) a broadcast, multicast, or unknown unicast packet that does not have a unique destination MAC address, respectively. By locating the endpoints, the L2 MHFE is able to establish tunnels between the MHFE and other MFEs and exchange the network data through the established tunnels. In some embodiments, a tunnel endpoint of an MHFE is also referred to as a hardware VTEP.

FIG. 8 illustrates a tunnel endpoint locator (Ucast_Macs_Remote) table 840, which is one of the tables of the database instantiated on the L2 TOR switch 795 to be configured by the control plane. Each record of the table 840 has several different fields (or table columns). In some embodiments, the fields include (i) a logical switch field 845 that specifies the logical switch with which a port of an end machine is associated (in case the table is instantiated on an L3 MHFE, this field also specifies the logical router ports associated with the logical switch), (ii) a MAC address field 850 that specifies the corresponding MAC address of the port (the MAC address of the end machine's port associated with the logical switch's port), (iii) an optional field 855 that can include an IP address associated with the MAC address, and (iv) a locator field 860 that specifies the IP address of the tunnel endpoint for the corresponding MAC address. The tunnel endpoint locator table is therefore also referred to as a tunnel endpoint table below.

As stated above, for an L3 MHFE, some embodiments configure the different logical router components on the endpoint locator table as well, the manner of which is described in detail in the U.S. patent application Ser. No. 14/815,839. Essentially, in order to configure the logical router on an L3 MHFE (e.g., a hardware VTEP that includes the Logical Router table in its database schema), some embodiments populate a record for each logical port of the distributed routing component in the table 840 in a first manner and a record for each logical port of the service routing component in a second different manner. For each port of the distributed routing component (e.g., DR 805) that is connected to a logical forwarding element (e.g., LS1 705 and LS2 710), some embodiments generate a record and stores (i) in a logical switch field, the logical switch to which the port is connected, (ii) in a MAC address field, the MAC address of the port, and (iii) in a locator field, a fixed IP address of 127.0.0.1, or the local host. The local host is a loopback interface address (127.0.0.1) in networking which can be used to access the machine's own network services.

In other words, when the L3 MHFE realizes that the destination MAC address of a packet belongs to a port of the distributed routing component, the VTEP of the MHFE does not establish a tunnel for routing the packet. This is because the distributed routing component, as described above, is implemented by every single MFE, MHFE, and gateway that participates in the logical network. As such, a packet whose destination MAC address is that of the logical router is not required to be routed to any other node in the network.

Some embodiments, on the other hand, populate the tunnel endpoint locator table with the tunnel endpoint data of each logical port of the service routing components that is connected to a logical forwarding element (e.g., an L2 logical switch). That is, for each logical port of the SRs, some embodiments store (i) in the logical switch field, the logical switch to which the port is connected (e.g., the transit logical switch to which the southbound port of the service component is connected), (ii) in the MAC address field, the MAC address of the port, and (iii) in the locator field, the IP address of the tunnel endpoint that implements the logical switch port to which the service component port is connected (e.g., the IP address of the gateway machine that implements the service routing component).

As for the end machines connected to the logical switches, for both L2 and L3 MHFEs, some embodiments store (i) in the logical switch field, the logical switch with one of the ports of which the end machine's port is associated, (ii) in the MAC address field, the MAC address of the associated port, and (iii) in the locator field, the IP address of the tunnel endpoint that implements the logical switch port with which the end machine's port is associated (e.g., the IP address of the MSFE or MHFE that implements the port of the logical switch). As stated before, the IP address field is optional. Furthermore, since the L2 MHFE depicted in this example is not capable of implementing logical routers, the endpoint locator shown in the example does not include any data corresponding to the logical router ports.

In the illustrated example, the tunnel endpoint locator table 840 includes the MAC address of the virtual machine 790 (MAC-VM) that is connected to the logical switch 705, in the MAC address field 850. The port of this virtual machine is associated with a logical port of the logical switch LS1, which is stored in the logical switch field 845. Since the MSFE implementing this logical switch 705 operates on the hypervisor HV1 on the host machine that also hosts virtual machine 790 (the host machine and MSFE are not shown in the figure), the control plane stores the IP address of this hypervisor in the locator field 860. As shown in the example, the IP field also stores the IP address of the virtual machine virtual machine 790 (i.e., VM1). However, as described before, this field is optional in some embodiments.

Similarly, for L2 MHFEs, the control plane configures a second PTEP locator (Mcast_Macs_Remote) table 870 to specify the set of PTEPs addresses (i.e., the IP address of the PTEPs) to which an L3 packet must be forwarded. As shown in the figure the table 870 has three different fields 875-885 which are similar to the fields 845, 850, and 860 of table 840, with the exception that this table is for the destination MAC addresses that are not known to the MHFE (e.g., the MAC addresses associated with logical ports of the logical router) or the destination MAC addresses of multicast and broadcast packets in some embodiments. The control plane of some embodiments configures the multicast remote table such that the tunnel locator field of the table is populated with the IP addresses of the set of PTEPs. This way, any packet that has an unknown unicast MAC address (which is the case for the packets headed to DR ports, as the MAC address of these ports are unknown to the L2 hardware switch) will be forwarded to the set of PTEPs based on the data stored in the multicast remote table.

In the illustrated example, the PTEP locator table 870 includes the MAC addresses with unknown destinations (e.g., MAC addresses of L3 packets) that are connected to the logical switch 710 (LS2), in the MAC address field 880. The ports with unknown destination MAC addresses (e.g., the logical router southbound ports or the DR ports) associated with a logical port of the logical switch LS2, which is stored in the logical switch field 875. Finally, the locator field 885 stores the IP addresses of the hypervisors that execute the set of PTEPs to which the packets with unknown destination MAC address should be forwarded.

As described before, these PTEPs are the same PTEPs that handle the BUM traffic for the hardware switches in some embodiments. That is, in some embodiments, the set of PTEPs performs the packet replication job for hardware switches (e.g., L2 and L3 hardware switches) that are incapable of subscribing to multicast groups and therefore incapable of receiving IP multicast traffic. In other words, the PTEPs (also referred to as the replication/L3 offload machines) of a logical network are transport nodes of the logical network that offload (1) the distributed L3 functionalities for the L2 hardware VTEPs, and (2) the L2 BUM replication for L2 and L3 hardware VTEPs that participate in the logical network.

Two examples of routing the logical network traffic through a logical router implemented by a PTEP for the L2 MHFE 795 depicted in FIG. 8 are given below. In the first example, a physical machine 890 that is connected to one of the physical ports of the TOR switch 890 (i.e., physical port B) sends a packet to the TOR switch that is destined for the virtual machine 790 (VM1). As illustrated in FIG. 3, the virtual machine VM1 resides on a physical host machine 340 (Host1) that executes a managed software forwarding element 315 (MSFE). This virtual machine is attached to the logical switch 705 (LS1) through the port A of the virtual machine (i.e., port A of VM1 is associated with a logical port of LS1). The logical switch LS1 is implemented by the MSFE. The MSFE on the physical host machine Host1, the PTEP on the host machine Host2, and the TOR switch 890 are all configured (by the control plane) to implement the logical switches 105 and 110 (LS1 and LS2). Additionally the MSFE and PTEP are also configured to implement the DR 805, and the transit logical switch 820 (as illustrated in FIG. 3).

The first example packet processing describes an east-west routing. In some embodiments, the east-west traffic (e.g., traffic from an end machine on the logical switch LS1 to another end machine on the logical switch LS2) is handled primarily at the first-hop MFE and/or L3 MHFE, then tunneled to the destination MFE and/or MHFE. As such, the packets do not pass through the SRs, and thus do not receive any services provided by these SRs. Other embodiments, however, allow for routing policies that send certain east-west traffic to the SRs for processing.

As described above, in the first example, a physical machine 890 (e.g., a third-party server, a personal computer, a printer, etc.) that is connected to physical port B of the TOR switch 890 sends a packet to the virtual machine 790 (VM1) residing on the host machine Host1 (not shown in the figure). For this example, the different pipelines of different logical forwarding elements implemented by the MHFE is first described. Based on the source IP address of the packet (or the ingress port through which the packet is received), the datapath on the MHFE 890 initially runs the source logical switch pipeline, which is the logical switch 710 (LS2). The LS2 pipeline specifies to forward the packet to the DR 805, the pipeline for which takes place on a PTEP.

In some embodiments, however, as soon as the hardware switch realizes that the packet is an L3 packet, the hardware switch forwards the packet to the PTEP and all the pipelines including the pipeline of the logical switch LS2 are performed on the PTEP (which is the first hop for the packet). The pipeline of the DR identifies that the logical switch 705 (LS1) is the next hop based on the destination IP address of the packet. As such the PTEP is not required to establish a tunnel to any one of the gateway machines that implements the SRs, nor does it have to execute the pipeline for the transit logical switch 820 (LS3).

Instead, the PTEP executes the pipeline for the logical switch LS1 (the identified next hop), which is also implemented by the PTEP. This pipeline specifies to tunnel the packet to the MSFE that runs on host machine Host1, which also executes the destination virtual machine 790 (VM1). That is, the logical switch LS1 pipeline identifies the MSFE (or hypervisor HV1 as shown in the table 840 of FIG. 8) as the MSFE that implements the port of the logical switch LS1 that is associated with the destination port of virtual machine VM1. The logical switch LS1 pipeline then establishes a tunnel (e.g., a VXLAN tunnel) to this MSFE that also executes LS1 pipeline, encapsulates the packet with appropriate tunneling data and sends the packet to the other endpoint (i.e., the MSFE of Host1). Next, the MSFE receives the packet, decapsulates it (to remove the tunneling data), and identifies the destination virtual machine VM1 based on the destination MAC address of the packet. The MSFE then sends the packet to its final destination (i.e., the virtual machine VM1).

The L3 processing of the packet with example IP and MAC addresses of the ports is as follows. In the example, the physical machine 890 is connected to the physical port B of the hardware VTEP 795 that is associated with the logical switch 710 (LS2) as shown in FIG. 8, and has an IP address (e.g., IP-B which is 1.1.2.2) and a MAC address (e.g., MAC-B). Also the virtual machine VM1 has a virtual interface (e.g., port A), which is implemented on the MSFE (e.g., hypervisor HV1). Port A has an IP address (e.g., IP-A which is 1.1.1.1) and a MAC address (e.g., MAC-A), which is associated with the logical switch 705 (LS1).

As described above, the default gateway for the TOR switch 890 is the L2 port of the DR 805 (the default gateway has been assigned to the TOR switch 890 by assigning a static IP address to its different ports including port B, or through a DHCP service). The default gateway port L2 is in the same subnet as port B and has an IP address of 1.1.2.253 and a MAC address of MAC-L2 as shown in the FIG. 8. Although the physical machine 890 connected to the TOR switch 795 has the IP address of the default gateway L2, it is unaware of the MAC address of this default gateway (i.e., MAC-L2).

Therefore, the first step taken by the physical machine 890 is to learn the MAC address of the logical port L2 of the logical router. For this purpose, the physical machine connected to port B sends an address resolution protocol (ARP) query to the default gateway IP address (i.e., IP-L2 or 1.1.2.253). This ARP query arrives at the hardware VTEP 795 on the physical port B connecting to the physical machine 890. The VLAN binding field of the physical port B, which is stored in one of the database tables instantiated on the switch (e.g., vlan_binding filed in the Physical_Port table in the hardware VTEP database schema), indicates to the hardware VTEP that the packet belongs to the logical switch LS2. The ARP packet is a broadcast packet. As such, the hardware VTEP forwards (broadcasts) the ARP packet to any of the replication/L3 offload machines (as dictated by the Mcast_Macs_Remote table) on a VXLAN tunnel with a virtual network identification (VNI) of the logical switch LS2 (e.g., VNI-LS2). It should be noted that the offload machines (e.g., the designated set of PTEPs) at this stage perform the BUM traffic processing and not the routing processing since the ARP packet is a broadcast packet.

One of the replication offload machines obtains the IP-MAC information of the logical router port L2 from the control plane configuration data, generates an ARP response packet, and sends the RP response packet back to the hardware VTEP 795 over the VXLAN tunnel. The hardware VTEP forwards the ARP response packet to the physical machine 890 through the physical port B. Consequently the physical machine learns the MAC address of the logical port L2 of the logical router, which is the gateway port for the physical machine. Therefore, the physical machine 890 sends out an L3 packet that has a destination MAC address of MAC-L2, a source MAC address of MAC-B, a destination IP address of 1.1.1.1 (i.e. the IP address of VM1), and a source IP address of 1.1.2.2 (i.e., the IP address of TOR switch 890).

After the packet is received at the hardware VTEP 890, the hardware VTEP realizes that the packet is not an L2 packet and the hardware VTEP does not have a corresponding entry in its Ucast_Macs_Remote table for the destination MAC address of the packet. As such the hardware VTEP uses the Mcast_Macs_Remote table that is used for unknown destination addresses and forwards the packet to one of the L3 offload machines (i.e., one of the PTEPs). This is because the hardware VTEP does not know the destination MAC address and as such the PTEP locator table (i.e., the multicast remote table 870) indicates to the hardware VTEP that all packets with unknown destination MAC addresses should be forwarded to the set of PTEPs (i.e., to a set of IP addresses for the designated PTEPs).

As described before, one of the PTEPs takes the responsibility of performing routing operations for the hardware VTEP based on a load balancing or some other algorithm. The PTEP (the L3 offload machine) performs the necessary L3 processing on the packet received from the hardware VTEP. That is, the PTEP replaces the destination MAC address of the packet (MAC-L2) with the destination MAC address of the MSFE port that is associated with the virtual machine VM1 (MAC-A) and also replaces the source MAC address MAC-B with the logical router port's MAC address (MAC-L1) that is associated with the logical switch LS1. The source and destination IP addresses remain the same.

The PTEP then establishes a tunnel (e.g., a VXLAN tunnel) to the identified tunnel endpoint (MSFE running on the host machine Host1) and sends the packet to the destination port using the tunnel (e.g., after adding the tunnel encapsulation data to the packet). In the described example, the PTEP knows the MAC address associated with the destination IP address (from for example a cache memory) and as such changes the destination MAC address with the MAC address of port A of the virtual machine (the port associated with the hypervisor implementing the logical switch LS1). However, if the PTEP does not know this MAC address (i.e., MAC address MAC-A of port A) the PTEP generates an ARP query and sends an ARP request packet to the MSFE to learn the MAC address of the destination machine. The mechanism of generating ARP requests is different for different hardware and software VTEPs (hardware and software MFEs) in some embodiments. How the PTEP generates different ARP request packets for different VTEPS is discussed in more detail below in Section II.

A second packet processing example which involves north-south routing will now be described. In the second example, the same physical machine 890 on port B of the TOR switch 795 sends a northbound packet to a machine with an IP address of 10.10.10.10 in an external network. For this example, the different pipelines of different logical forwarding elements implemented by the MHFE is first described. Based on the source IP address of the packet (or the ingress port through which the packet is received), the datapath on the MHFE 890 initially runs the source logical switch pipeline, which is the logical switch LS2. The logical switch LS2 pipeline specifies to forward the packet to the DR 805, the pipeline for which takes place on a PTEP. As described in the first routing example, in some embodiments, as soon as the MHFE realizes that the packet is not an L2 packet, the MHFE sends the packet to the PTEP to do all the pipeline processing including the logical switch LS2 pipeline.

This pipeline of the DR identifies one of the SRs implemented on a gateway machine as its next hop since the subnet of the destination IP address is shared with both SR subnets (some embodiments use ECMP to select one of the SRs). Next, the PTEP executes the pipeline for the transit logical switch 820 (LS3), which specifies to tunnel the packet to the appropriate gateway machine (edge node) that hosts (implements) the selected SR (e.g., one of the gateway machines 330 and 335 in FIG. 3). The gateway machine (i.e., the MFE on the gateway machine) receives the packet, decapsulates it (to remove the tunneling data), and identifies the SR based on the logical context information on the packet (e.g., the VNI of the transit logical switch 820) as well as the destination MAC address that corresponds to the SR's southbound interface. The SR pipeline is then executed (by the MFE in some embodiments, and by a VM implementing the SR in other embodiments). The SR pipeline sends the packet to the physical network that has the destination IP address.

The L3 processing of the packet with example IP and MAC addresses of the ports is as follows. Similar to the first example, the physical machine 890 is connected to port B of the hardware VTEP 795, which is associated with the logical switch LS2 and has an IP address of 1.1.2.2 and a MAC address of MAC-B. Also as stated before, the packet is being sent to a machine with an IP address of 10.10.10.10 in an external network (e.g., a network outside of the datacenter network).

As described above, the default gateway for the TOR switch is the L2 port of the DR 805. The default gateway port L2 is in the same subnet as port B and has an IP address of 1.1.2.253 and a MAC address of MAC-L2. Therefore, the physical machine (on port B of the TOR switch) sends an L3 packet that has a destination MAC address of MAC-L2, a source MAC address of MAC-B, a destination IP address of 10.10.10.10, and a source IP address of IP-B. After the packet is received at the hardware VTEP 795, the VTEP realizes that it does not know the destination MAC address of the packet. This is because the destination MAC address belongs to a logical port of the logical router, which is not implemented by the hardware VTEP. As such, the hardware VTEP sends the packet to a PTEP for further L3 processing in the same manner that was discussed above in the first example.

The PTEP starts to perform the L3 processing on behalf of the hardware VTEP by replacing the destination MAC address of the packet (MAC-L2) with the destination MAC address of any of the SRP1 and SRP2 ports of any of the service routers 810 and 815 associated with the transit logical switch 820. The PTEP also replaces the source MAC address MAC-B with the MAC address of northbound logical port of the DR 805 (i.e., MAC3). The source and destination IP addresses remain the same.

In some embodiments the PTEP decrements the time to live (TTL) field of the packet header in an east-west routing (i.e., when only the DR port of the logical router performs the routing such as the routing in the first example). The PTEP of some embodiments, however, does not decrement the TTL at the DR routing level when both the distributed routing component and service routing component of the logical router participate in the routing of the packet (as in the second example). This is because the TTL should not be decremented twice when in fact only one logical router performs the routing process. That is, even though two routing components are participating in the routing of the packet in this example, these two components belong to a single logical router and as such act as one router. In some embodiments, the TTL is decremented at the SR routing level (and therefore only once).

In order to replace the source MAC address, the PTEP looks at the static routes in the RIB of the logical router and based on the destination IP address of the packet (i.e., 10.10.10.10) determines that the egress port should be sent to either SRP1 or SRP2. Therefore the packet must egress from port DRP1 of the DR 805, which has the MAC address of MAC3. The hardware VTEP may choose SRP1 or SRP2 as the next hop using an ECMP algorithm (e.g., based on the hash of the packet header, the hardware VTEP may choose the next hop as SRP1 or SRP2).

The PTEP also looks up the destination IP address in the tunnel endpoint information configured on the PTEP and identifies both of the southbound logical port of the SR (either MAC1 or MAC2) as well as the tunnel endpoint locator address of the gateway machine that implements the logical switch (i.e., transit logical switch LS3) associated with this port (i.e., the IP address of either gateway machine Gateway 1 or gateway machine Gateway 2 which are implementing the transit logical switch). The PTEP then establishes a VXLAN tunnel (depending on which SR is chosen) to the identified tunnel endpoint (e.g., an MFE operating on one of these two gateway machines if the SR is implemented by the MFE) and sends the packet to the destination port using the VXLAN tunnel (e.g., after adding the tunnel encapsulation data to the packet).

II. Generating ARP Queries for L2 Hardware Switches

As described above, some embodiments implement the distributed routing component of a logical router on every MSFE (including the PTEPs) and L3 MHFE that participates in the logical network (i.e., implements the LFEs of the logical network). Each logical port of the logical router has a virtual MAC (VMAC) address that is associated with a logical port of a logical switch. When a PTEP performs the L3 functionalities on an L3 packet on behalf of an L2 MHFE, the PTEP needs to know the next destination MAC address of the L3 packet (e.g., next hop, destination virtual or physical machine, etc.) to route the packet towards its final destination.

When the PTEP does not have the next destination MAC address of the L3 packet (e.g., the address was not previously learned and cached), the PTEP generates an address resolution protocol (ARP) query in order to learn the destination MAC address. That is, the PTEP sends an ARP request packet to all network elements that are in the subnet associated with the destination network address (IP address) of the L3 packet. The source MAC address of the ARP packet should be the VMAC address of the logical port of the distributed router from which the ARP packet is sent. Since this VMAC address is common between all of the MSFEs and L3 MHFEs that implement the distributed router, using the VMAC address does not guaranty that the ARP reply packet returns to the originator of the ARP request packet.

In order to guaranty that the ARP reply packet returns to the originator of the ARP request packet, some embodiments use a physical MAC (PMAC) address that is unique for each MSFE and L3 MHFE of the logical network (including the PTEPs). In some embodiments, the PTEP (or any other forwarding element that generates an ARP request to learn the destination MAC address) uses this unique PMAC address as the source address of the ARP request packet when the PTEP sends the packet to other MSFEs and L3 MHFEs.

On the other hand, when the PTEP sends the ARP request packet to an L2 MHFE, the PTEP of some embodiments, uses the VMAC address of the logical port of the distributed router instead of the PMAC address of the MSFE. This is because the PMAC value in the source MAC address of the ARP request packet would confuse the L2 MHFE as it does not match the VMAC of the logical router port.

(When an L2 hardware VTEP receives an L3 packet from the physical workload attached to the hardware VTEP that has a destination MAC address of a logical router port, the destination address is treated as an unknown address. This is because the hardware VTEP does not have the necessary information to implement the logical router, which causes the hardware VTEP to subsequently forward the packet to a PTEP that implements the logical router. Even though the hardware VTEP does not know the destination MAC address of the packet, the hardware VTEP stores the MAC address of the logical router port in a local cache as it does for any other outgoing packet. Therefore, when the hardware VTEP receives the PMAC address as the destination MAC address that the ARP response packet should be sent to, the hardware VTEP would not be able to match the address against the previously cached addresses, which results in the confusion of the hardware VTEP. This problem does not exist for the MSFEs and L3 MHFEs though, since these MFEs implement a mechanism to switch the PMAC addresses to their corresponding VMAC addresses before the ARP request packets are sent to the destination end machines connected to the MFEs. The MSFEs and L3 MHFEs also switch back the VMAC addresses to their original PMAC address after the ARP reply packets are received from the destination end machines. As such, the MSFEs and L3 MHFEs can match the VMAC address against their local cache tables and do not get confused. Using PMAC address instead of VMAC addresses and switching between the two addresses at different MFEs are described in great detail in the PCT Patent Application PCT/US2014/060183, filed Oct. 10, 2014, now published as International Patent Publication WO/2015/054671, which is incorporated herein by reference.)

Using the VMAC address, however, could cause the L2 MHFE to forward the ARP reply packet to a different PTEP (other than the originator of the ARP request packet). This is because the L2 MHFE sends the packets with unknown destination MAC addresses to a designated set of PTEPs that is supposed to handle the routing function. One of the PTEPs, based on a particular algorithm (e.g., the has of the packet header), will be selected to process the L3 packet sent by the L2 hardware VTEP. The selected PTEP, however, might be a different PTEP from the PTEP that originated the ARP query. To address this issue, in some embodiments, the originator PTEP of the ARP request forwards a copy of the ARP request packet to all other designated PTEPs (i.e., PTEPs that might receive the ARP reply packet from the hardware VTEP), in addition to forwarding the ARP request packet to the L2 hardware VTEP. Forwarding the copies of the ARP request packet enables all other designated PTEPs to identify the original requester of a given ARP query. Therefore, when the ARP reply packet from an L2 hardware VTEP arrives at a different PTEP, that different PTEP forwards the reply packet to the PTEP that originated the ARP request.

Similar to PTEPs, any other managed forwarding element (e.g., a MSFE or an L3 MHFE) also uses a unique PMAC address when generating ARP requests to learn the next destination MAC address (e.g., when an MSFE sends an ARP query from a logical router port that the MSFE implements to other MFEs). Before forwarding the ARP request to an L2 hardware VTEP though, the managed forwarding element replaces the PMAC address with the VMAC address of the logical router port in the same manner that was described above for the PTEPs. Additionally, the managed forwarding element sends a copy of the ARP request to all of the L3 offload engines (i.e., designated PTEPs) to enable the offload engines to identify the original ARP requester. The ARP reply from the hardware VTEP may arrive at any L3 offload engine, which can then be forwarded to the originator of the ARP request.

Figure 9:
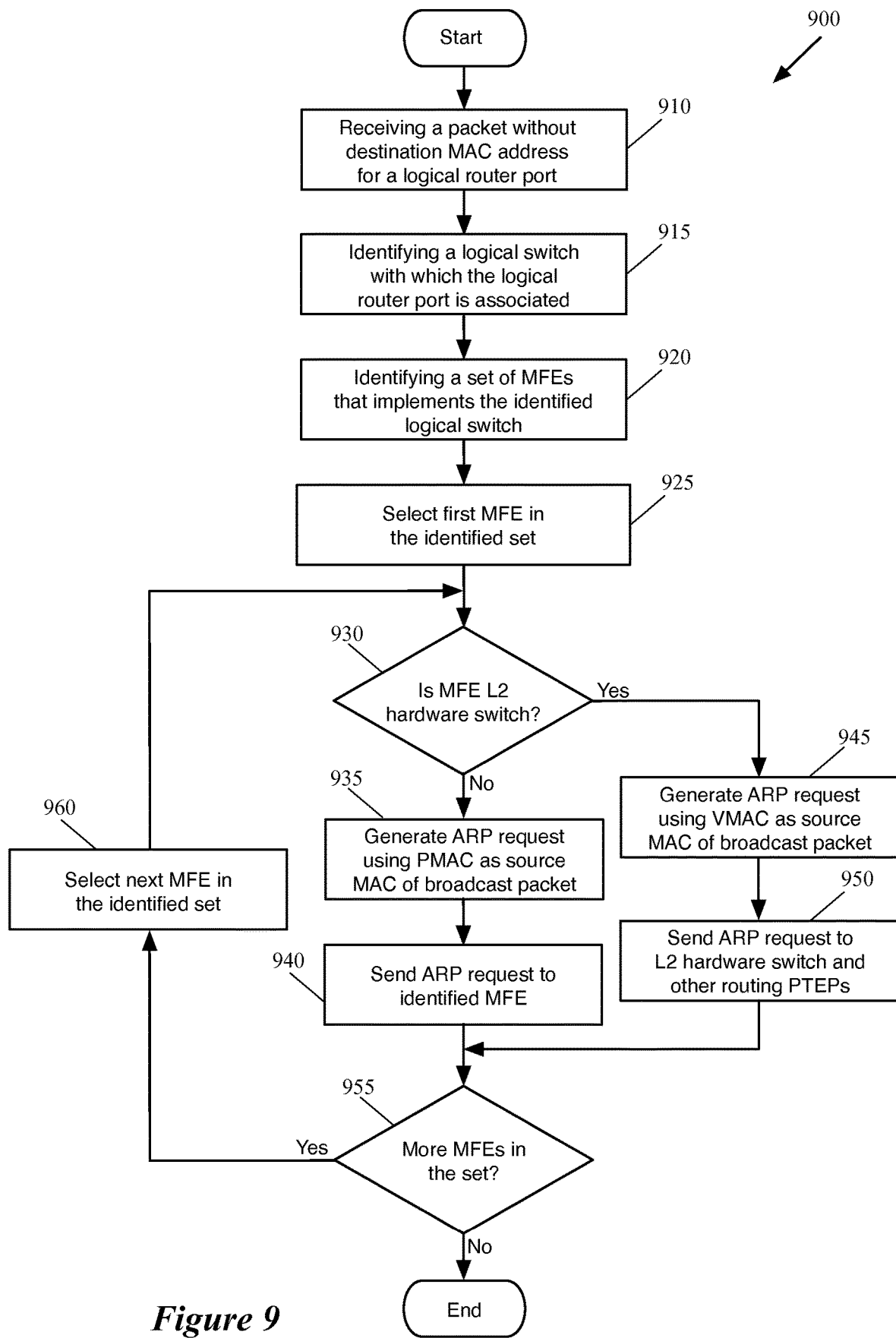
FIG. 9 conceptually illustrates a process that a managed forwarding element of a logical network performs in order to generate and send ARP requests to other managed forwarding elements of the logical network.

For some embodiments, FIG. 9 conceptually illustrates a process 900 for generating and sending ARP requests to other managed forwarding elements of a logical network. Some embodiments perform the process 900 at a managed forwarding element (software or hardware) that implements a logical router. In some embodiments, when a PTEP (or any other software VTEP or L3 hardware VTEP) needs to send an L3 packet towards its final destination, the PTEP performs the process 900 in order to generate an ARP query. It is worth noting that the process 900 as described below is for a one layer logical router (i.e., a logical router that is not connected to another logical router). If a logical network includes a multilayer logical router, the operations of process 900 will be repeated or modified for some embodiments.

The process begins by receiving (at 910) an L3 packet that has a destination IP address but does not have a destination MAC address. The received L3 packet is forwarded from a logical router port implemented by the MFE to a next or final destination of the packet.

The process then identifies (at 915) a logical switch with which the logical router port is associated. The process of some embodiments identifies a logical switch that is connected to the logical router by determining that the logical port of the logical switch is associated with the same subnet as the logical router port. That is, the destination IP address of the received packet is associated with the same subnet as the logical port of the logical switch and the logical router port.

The process then identifies (at 920) a set of MFEs (hardware or software) that implements the identified logical switch. As described above, the process of some embodiments makes such identification based on the forwarding tables of each MFE.

After the different MFEs are identified, the process starts processing the MFEs by selecting (at 925) the first MFE in the identified set. The process then determines (at 930) whether the selected MFE is an L2 hardware switch or an L3 hardware switch. As described above, an L2 hardware switch is a hardware switch that is incapable of implementing the defined routing components of the logical router. In other words, the necessary forwarding tables that specify how to implement the routing components of the logical router (e.g., the logical router table) are not defined in the database schema of an L2 hardware switch.

The process then determines (at 930) whether the selected MFE is a L2 MHFE. If so, the process proceeds to 945. When the process determines that the selected MFE is not a L2 MHFE, the process generates (at 935) an ARP request using the PMAC address of the MFE (e.g., a PTEP) as the source MAC address of the broadcast ARP request packet. That is, the process 900, instead of using the VMAC address of the logical router port from which the ARP request packet should be sent, inserts a unique PMAC address of the PTEP that is implementing the logical router in the source MAC address of the ARP request packet. The process then sends (at 940) the generated ARP request packet to the identified MFE (that is not an L2 hardware switch).

After sending the ARP request, the process determines (at 955) whether there are more MFEs in the identified set of MFEs. If the process determines that there are more MFEs in the set, the process selects (at 960) the next MFE in the set of identified MFEs and returns to operation 930 to determine the type of the next selected MFE and to process the MFE based on its type. If the process determines that there is no more MFE left in the identified set of MFEs, the process ends.

When the process determines (at 930) that the selected MFE is an L2 MHFE (e.g., a hardware switch that is not able to implement the defined logical routing components), the process generates (at 945) an ARP request using the VMAC address of the logical router port as the source MAC address of the broadcast ARP request packet. That is, the process, injects the VMAC address in the source MAC address of the ARP request packet. The process then sends (at 950) the generated ARP request packet to the identified L2 hardware VTEP as well as the other designated PTEPs (i.e., designated L3 offload engines).

As described above, the process sends the ARP packet that is sent to an L2 hardware switch, to other designated PTEPs, because when the hardware switch sends a reply packet back, the reply packet may be received by a different PTEP other than the originator MFE of the ARP request. That is, because the hardware VTEP has the VMAC address of the logical router port as its destination MAC address which is unknown to the hardware VTEP, the hardware VTEP sends the packet with unknown destination to every PTEP in the set of designated PTEPs as described above. As such, if a different PTEP receives the ARP reply packet form the L2 hardware VTEP, that different PTEP will know what PTEP or MFE has originated the ARP request and forwards the received ARP reply packet to the originator of the ARP request.

Some embodiments perform variations of the process 900. The specific operations of the process 900 may not be performed in the exact order shown and described. For example, some embodiments first identify the type of each of the MFEs that implements the logical switch in order to determine which MFEs are L2 hardware switches. Some such embodiments then generate the ARP request for all of the MFEs (L2 and L3) and send the ARP request packet to these forwarding elements simultaneously but in different manners as described above. Additionally, the specific operations may not be performed in one continuous series of operations, and different specific operations may be performed in different embodiments.

Figure 10:
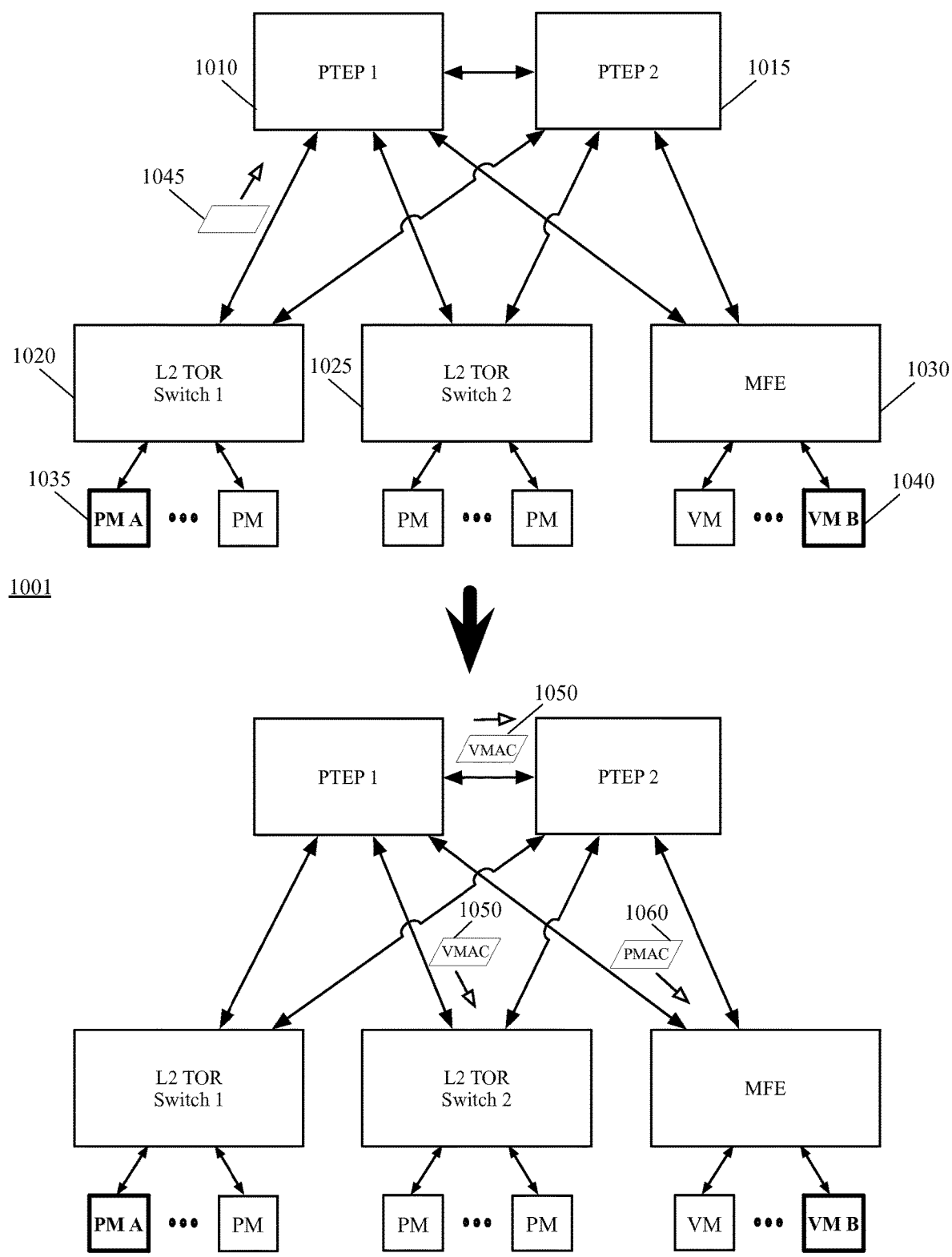
FIG. 10 illustrates an example of how a managed forwarding element of some embodiments generates and forwards different ARP request packets for the same ARP query and send the packets to different managed forwarding elements.

FIG. 10 illustrates an example of how a managed forwarding element (hardware or software) of some embodiments generates and forwards different ARP request packets for the same ARP query and sends the packets to different managed forwarding elements. More specifically, the figure shows, in two different stages 1001 and 1002, how a PTEP sends different ARP request packets to different types of forwarding elements differently. The figure shows a logical network that includes two designated PTEPs 1010 and 1015, a set of software and hardware managed forwarding elements 1020-1030, a set of physical machines (PMs) including the PM 1035 (PM A) that are connected to the L2 hardware switches 1020 and 1025, and a set of virtual machines (VMs) including the VM 1040 (VM B) that are connected to the MFE 1030 (e.g., a software MFE that operates in a hypervisor of a host machine).

In the first stage, the physical machine 1035 that is connected to the hardware switch 1020 has initiated a communication and sent a packet 1045 towards the destination virtual machine 1040 that is connected to the MFE 1030. Although not shown in the figure, these two end machines (i.e., PM A and VM B) are connected to two different logical switches that are connected through a logical router of the logical network. As such, the packet 1045 is an L3 packet and for the reasons that were described above, the hardware switch 1020 is not capable of processing the packet (because the switch does not implement the logical routing components of the logical router). Therefore, the L2 hardware switch 1020 sends the L3 packet 1045 to the PTEP 1010 in order for the PTEP to perform the necessary routing operations on the packet on behalf of the hardware switch 1020. The packet 1045 includes the IP address of the VM B as its destination IP address but does not have the MAC address of this virtual machine.

The PTEP 1010 receives the packet 1045 and starts performing the L3 operations on the packet on behalf of the hardware switch. When the PTEP 1010 realizes (through the DR pipeline executing on the PTEP) that the packet does not have the destination MAC address (i.e., the destination MAC address of the VM 1040), the PTEP 1010 generates an ARP request to learn this destination MAC address. In some embodiments, the PTEP matches the destination IP address of the packet against the previously cached MAC addresses and when the PTEP does not find a match, the PTEP generates an ARP query to learn the MAC address.

The generated ARP request packet is broadcast to all of the end machines that are on the same subnet on which the logical switch connected to the logical router port is. The PTEP, however, first identifies the forwarding elements that implement this logical switch and through which the end machines are connected to the logical network. After such identification, the PTEP realizes that the forwarding elements that implement the logical switch include an L2 hardware switch 1025 and an MFE 1030. That is, some of the PMs connected to the L2 TOR switch 1025 and some of the VMs connected to the MFE 1030 (including the VM 1040) are associated with the same subnet, with which, the logical switch (implemented by the L2 TOR switch and the MFE) is associated.

The second stage 1002 shows that the PTEP 1010 is sending two ARP request packets 1050 that are generated for the ARP query to the PTEP 1015 and the TOR switch 1025. The two generated ARP request packets have the same VMAC address as their source MAC addresses. That is, when the destination end machine receives the ARP request packet, the destination end machine will insert its MAC address in an ARP reply packet and sends the ARP reply packet to the destination MAC address of the VMAC. The stage 1002 also shows that the PTEP 1010 is sending an ARP request packet 1060 that is generated for the same ARP query to the MFE 1030. However, the generated ARP request packet 1060 has a PMAC address that is unique to the PTEP 1010 as the source MAC address of the packet. The reason for having two different source MAC addresses for different ARP packets has been described in detail above. Essentially, when the PTEP that generates the ARP query identifies that one of the recipients of the ARP request packet is an L2 hardware switch, the PTEP uses the VMAC address as source MAC address rather than switching to its own PMAC address in order not to confuse the L2 hardware switch.

However, because the recipient hardware switch uses the VMAC address as the destination MAC address of the ARP reply packet, the originator PTEP 1010 would send the ARP request packet to every other designated PTEP as well (i.e., the PTEP 1015). This way, if the other PTEP 1015 receives the ARP reply packet back from a L2 hardware switch, the PTEP 1015 knows that the ARP reply packet should be forwarded to the originator PTEP 1010. On the other hand, the PTEP 1010 sends the ARP packet with the PMAC address as the source MAC address of the packet to the MFE 1030 because the MFE 1030 uses a mechanism that changes the PMAC to the VMAC of the logical router port before sending the packet to the VMs, When the VM 1040 receives the ARP request from the MFE 1030, the VM injects its MAC address into the ARP reply packet and sends the packet back to the MFE 1030. The MFE then switches the VMAC address in the reply packet back to the destination PMAC address of the ARP reply packet and send the packet back to the PTEP 1010 using the PMAC address as the destination. The PTEP 1010 receives the ARP reply packet from the MFE 1030 and injects the learned MAC address of the VM 1040 into the destination MAC address of the packet 1045. The PTEP then sends the packet to MFE 1030 to be forwarded to the final destination of the packet, which is the virtual machine 1040. The PTEP also caches the newly learned MAC address of the virtual machine 1040 along with its IP address in a local cache of the PTEP. This way, next time the PTEP receives an L3 packet that has the destination IP address of the VM 1040, the PTEP will not generate another ARP query and simply retrieves the destination MAC address from its local cache.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
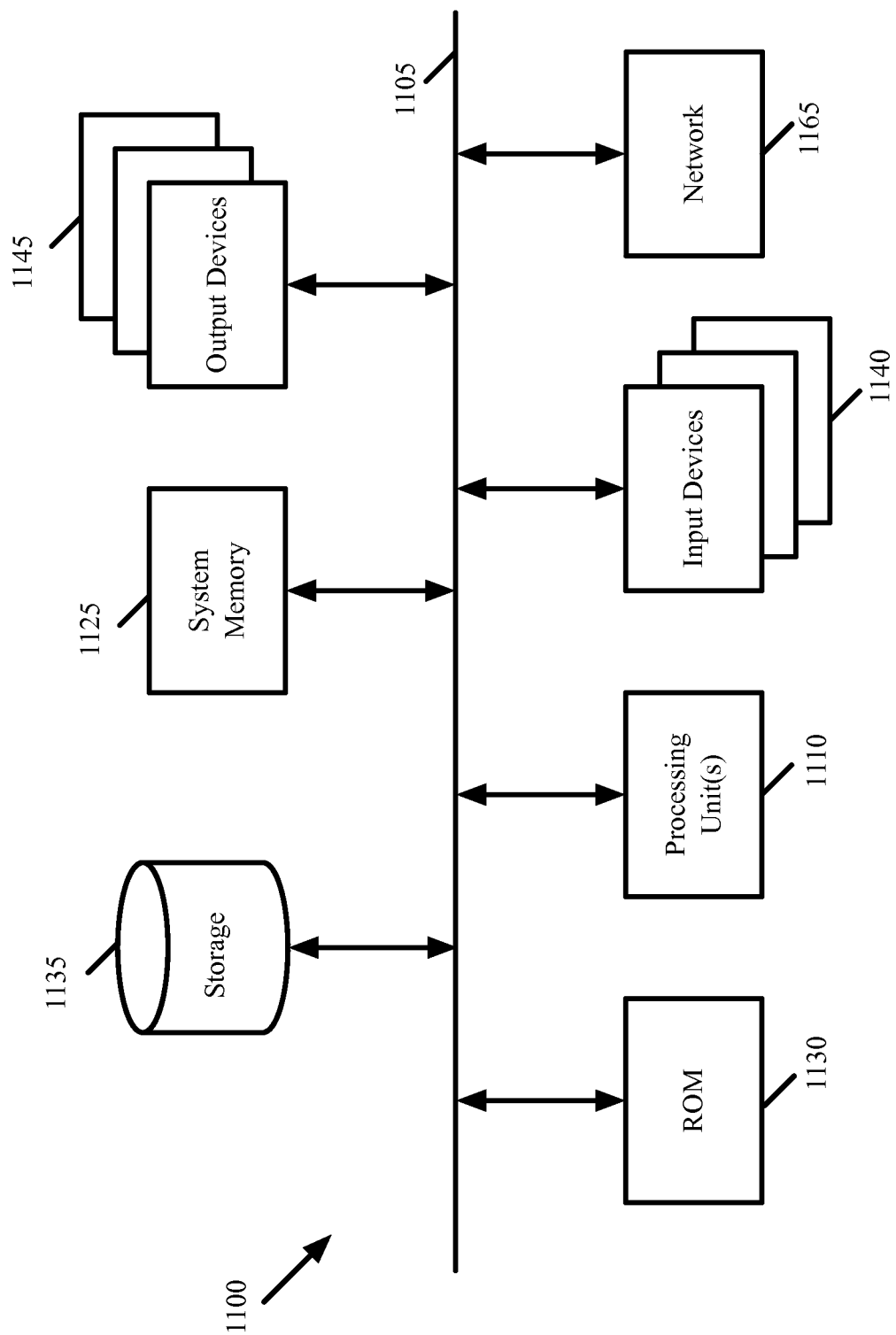
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieves instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device. Like the permanent storage device 1135, the system memory 1125 is a read-and-write memory device. However, unlike storage device 1135, the system memory 1125 is a volatile read-and-write memory, such a random access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alpha-numeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 5, 6 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a managed forwarding element (MFE) that operates on one of a plurality of host machines to perform logical routing operations in a logical network on behalf of a hardware switch, the method comprising:

at a controller computer;
receiving data defining a logical router that logically connects a plurality of end machines operating on the plurality of host machines to a plurality of physical machines that are connected to the hardware switch;
defining, based on the received data, a distributed routing component that is implemented by (i) the MFE, (ii) a plurality of other MFEs operating on a plurality of other host machines and (iii) at least one other hardware switch;
configuring the MFE that operates on one of the host machines to implement the logical router in order to enable the MFE to perform logical routing operations for the hardware switch; and
configuring the hardware switch to, upon receiving an L3 packet from one of the plurality of physical machines, forward the L3 packet to the MFE to perform the logical routing operations on the L3 packet.

2. The method of claim 1, wherein configuring the hardware switch comprises populating a particular database table of a database stored on the hardware switch with a physical address of the MFE such that the hardware switch sends the L3 packet to the MFE using the address.

3. The method of claim 2, wherein the physical address comprises the Internet Protocol (IP) address of a virtualization software of a machine that executes the MFE.

4. The method of claim 1, wherein the L3 packet comprises a destination media access control (MAC) address of a logical router port that is unknown to the hardware switch.

5. The method of claim 1 further comprising defining, based on the received data, a set of service routing components for the logical router, wherein at least one service routing component is neither implemented by the other hardware switch nor by the MFE.

6. The method of claim 5, wherein the at least one service routing component is implemented by a gateway machine that connects the logical network to one or more external physical networks.

7. The method of claim 6, wherein the distributed routing component of the logical router is also implemented by the gateway machine.

8. A method for configuring a managed forwarding element (MFE) that operates on one of a plurality of host machines to perform logical routing operations in a logical network on behalf of a hardware switch, the method comprising:

at a controller computer;
receiving data defining a logical router that logically connects a plurality of end machines operating on the plurality of host machines to a plurality of physical machines that are connected to the hardware switch;
configuring the MFE that operates on one of the host machines to implement the logical router in order to enable the MFE to perform logical routing operations for the hardware switch; and
configuring the hardware switch to, upon receiving an L3 packet from one of the plurality of physical machines, forward the L3 packet to the MFE to perform the logical routing operations on the L3 packet,
wherein the hardware switch is an L2 hardware switch that is incapable of performing logical routing operations.

9. A non-transitory machine readable medium of a controller computer storing a controller application for configuring a set of managed forwarding element (MFEs) to perform logical routing operations on behalf of a hardware switch, the application executable by at least one processing unit of the controller computer, the controller application comprising sets of instructions for:

receiving data for a logical router that logically connects a plurality of end machines operating on a plurality of host machines to a plurality of physical machines that are connected to the hardware switch;
defining a plurality of routing components for the logical router based on the received data, wherein the plurality of routing components comprises a distributed routing component that is implemented by (i) the set of MFEs and (ii) at least one other hardware switch;
configuring the set of MFEs to implement the plurality of routing components in order to perform logical routing operations for the hardware switch; and
configuring the hardware switch to, upon receiving an L3 packet from one of the plurality of physical machines, forward the L3 packet to one of the set of MFEs to perform the logical routing operations on the L3 packet.

10. The non-transitory machine readable medium of claim 9, wherein the set of instructions for configuring the hardware switch comprises a set of instructions for populating a particular database table of a database stored on the hardware switch with a physical address of the set of MFEs such that the hardware switch sends the L3 packet to the set of MFEs using the address.

11. The non-transitory machine readable medium of claim 10, wherein the controller application is one of a plurality of controller applications for configuring and managing the set of MFEs including the hardware switch to implement a plurality of logical forwarding elements including the logical router for a logical network.

12. The non-transitory machine readable medium of claim 9 wherein the L3 packet comprises a destination media access control (MAC) address of a logical router port that is unknown to the hardware switch.

13. The non-transitory machine readable medium of claim 9, wherein the plurality of routing components further comprises a set of service routing components that is neither implemented by the other hardware switch nor by the MFE.

14. The non-transitory machine readable medium of claim 13, wherein the at least one service routing component is implemented by a gateway machine that connects the logical network to one or more external physical networks.

15. The non-transitory machine readable medium of claim 14, wherein the distributed routing component of the logical router is also implemented by the gateway machine.

16. A non-transitory machine readable medium of a controller computer storing a controller application for configuring a set of managed forwarding element (MFEs) to perform logical routing operations on behalf of a hardware switch, the application executable by at least one processing unit of the controller computer, the controller application comprising sets of instructions for:

receiving data for a logical router that logically connects a plurality of end machines operating on a plurality of host machines to a plurality of physical machines that are connected to the hardware switch;

defining a plurality of routing components for the logical router based on the received data for the logical router;

configuring the set of MFEs to implement the plurality of routing components in order to perform logical routing operations for the hardware switch; and configuring the hardware switch to, upon receiving an L3 packet from one of the plurality of physical machines, forward the L3 packet to one of the set of MFEs to perform the logical routing operations on the L3 packet, wherein the hardware switch is an L2 hardware switch that is incapable of performing logical routing operations.

* * * * *